United States Patent
Higginbotham, III

(10) Patent No.: US 10,202,156 B2
(45) Date of Patent: Feb. 12, 2019

(54) STABILIZER FRAME APPARATUSES AND METHODS OF USING SAME

(71) Applicant: Hydraulic Systems, Inc., The Woodlands, TX (US)

(72) Inventor: Carl Flynt Higginbotham, III, Roman Forest, TX (US)

(73) Assignee: Hydraulic Systems, Inc., The Woodlands, TX (US)

( * ) Notice: Subject to any disclaimer, the term of this patent is extended or adjusted under 35 U.S.C. 154(b) by 0 days.

(21) Appl. No.: 15/336,953

(22) Filed: Oct. 28, 2016

(65) Prior Publication Data

US 2017/0101144 A1    Apr. 13, 2017

Related U.S. Application Data

(63) Continuation-in-part of application No. 14/830,169, filed on Aug. 19, 2015.

(60) Provisional application No. 62/039,885, filed on Aug. 20, 2014.

(51) Int. Cl.
*B62D 57/00* (2006.01)
*B62D 57/02* (2006.01)
*B62D 57/032* (2006.01)

(52) U.S. Cl.
CPC ......... *B62D 57/022* (2013.01); *B62D 57/032* (2013.01); *Y10S 280/901* (2013.01)

(58) Field of Classification Search
CPC .... B62D 57/00; B62D 57/022; B62D 57/032; Y10S 280/901
See application file for complete search history.

(56) References Cited

U.S. PATENT DOCUMENTS

| | | | |
|---|---|---|---|
| 2,399,375 A | 4/1946 | Mullins | |
| 3,114,425 A | 12/1963 | Adams | |
| 3,265,145 A | 8/1966 | Beitzel | |
| 3,375,892 A | 4/1968 | Kraschnewski et al. | |
| 3,493,064 A | 2/1970 | Wilson | |

(Continued)

FOREIGN PATENT DOCUMENTS

CN    1515477 A    7/2004

OTHER PUBLICATIONS

Non-final Office Action received for U.S. Appl. No. 15/223,091, dated Apr. 4, 2018, 11 pages (Reference Purpose Only).

(Continued)

*Primary Examiner* — Kevin Hurley
(74) *Attorney, Agent, or Firm* — Jones Walker LLP

(57) ABSTRACT

A stabilizer frame apparatus may be configured for engaging a load transporting apparatus for purposes of moving a load. The stabilizer frame apparatus may have or include a first stabilizer bar and a second stabilizer bar where the stabilizer frame apparatus is configured to operatively integrate into a load structure. The first stabilizer bar may have a first end and a second end, and the second stabilizer bar may have a first end and a second end. The first end of the first stabilizer bar may be operatively coupled to the first end of the second stabilizer bar. Similarly, the second end of the first stabilizer bar may be operatively coupled to the second end of the second stabilizer bar. In a non-limiting embodiment, the load transporting apparatus may maintain a substantially parallel configuration between the sidewalls of the load structure during movement.

11 Claims, 24 Drawing Sheets

(56) References Cited

U.S. PATENT DOCUMENTS

| | | | |
|---|---|---|---|
| 3,512,597 A | 5/1970 | Baron | |
| 3,527,313 A | 9/1970 | Reimann | |
| 3,765,499 A | 10/1973 | Harmala | |
| 4,252,204 A | 2/1981 | Bishop | |
| D266,777 S | 11/1982 | Lucas, Jr. et al. | |
| 4,438,712 A | 3/1984 | Ducellier | |
| 4,674,949 A * | 6/1987 | Kroczynski | B25J 5/00 114/222 |
| 4,940,382 A * | 7/1990 | Castelain | B62D 57/00 114/222 |
| 5,170,733 A | 12/1992 | Honma et al. | |
| 5,351,626 A * | 10/1994 | Yanagisawa | B62D 57/032 180/164 |
| 5,351,773 A * | 10/1994 | Yanagisawa | B62D 57/032 180/8.3 |
| 5,839,532 A * | 11/1998 | Yoshiji | B62D 57/00 180/164 |
| 5,921,336 A * | 7/1999 | Reed | B62D 57/00 180/8.1 |
| 6,581,525 B2 | 6/2003 | Smith | |
| 7,444,951 B2 | 11/2008 | Ishikawa et al. | |
| 7,703,562 B2 * | 4/2010 | Kalik | H02K 7/1892 180/65.31 |
| 7,819,209 B1 | 10/2010 | Bezner | |
| 8,561,733 B2 | 10/2013 | Smith et al. | |
| 8,850,999 B1 | 10/2014 | Kalkbrenner | |
| 9,045,178 B2 * | 6/2015 | Smith | B62D 57/02 |
| 9,415,819 B2 * | 8/2016 | Vogt | E21B 15/003 |
| 9,463,833 B2 | 10/2016 | Smith et al. | |
| 2004/0074679 A1 | 4/2004 | Miyazaki et al. | |
| 2004/0211603 A1 | 10/2004 | Furuta et al. | |
| 2004/0238240 A1 | 12/2004 | Hirose et al. | |
| 2005/0016788 A1 | 1/2005 | Kitano et al. | |
| 2006/0243498 A1 | 11/2006 | Takemura et al. | |
| 2011/0231050 A1 | 9/2011 | Goulding | |
| 2012/0080242 A1 | 4/2012 | Mantzel | |
| 2012/0219242 A1 | 8/2012 | Stoik et al. | |
| 2014/0161581 A1 | 6/2014 | Smith et al. | |
| 2017/0088206 A1 * | 3/2017 | Esteban Finck | B62D 57/032 |

OTHER PUBLICATIONS

Screenshot of webpage retrieved on Aug. 24, 2018 from https://www.youtube.com/watch?v=YX0syqSlnzU. Robosynth. "Walking Robot Forward, Backward, and Turn." Published Jul. 1, 2009 based on the youtube webpage.

* cited by examiner

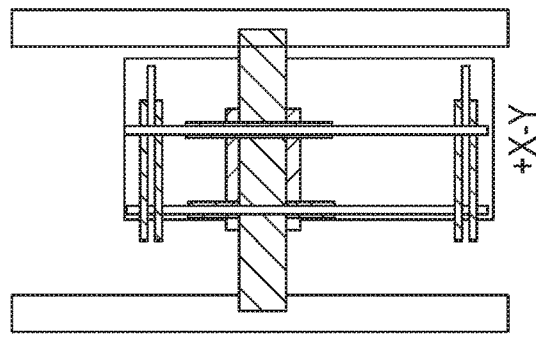
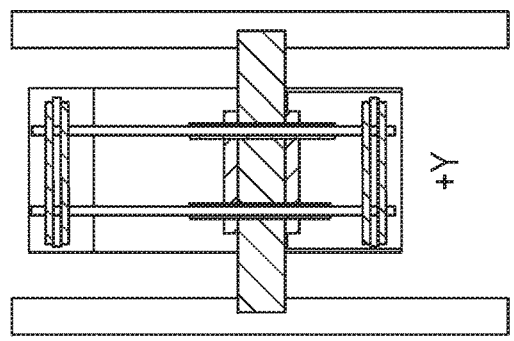
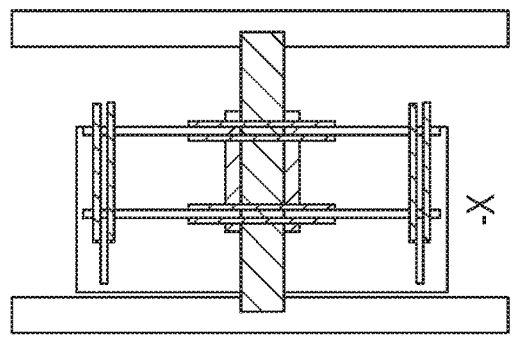
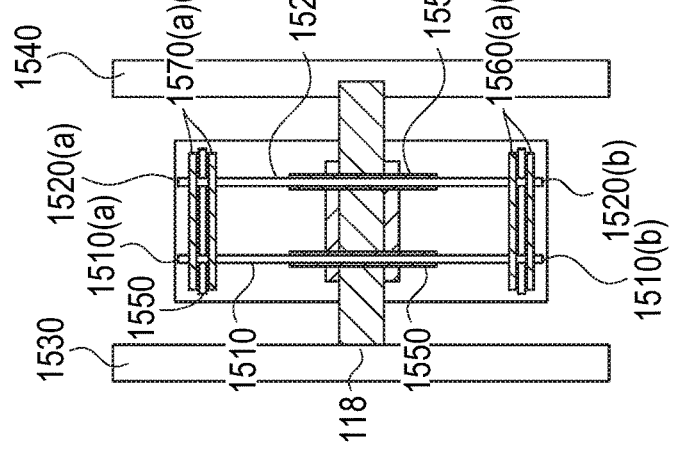
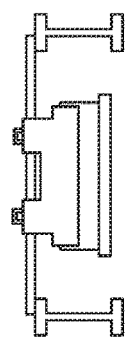

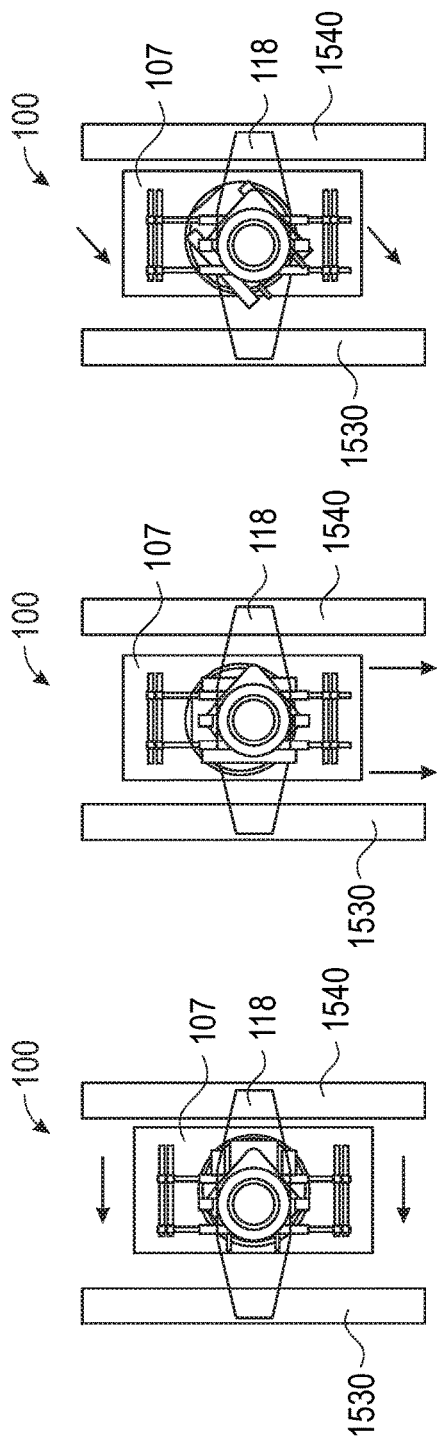
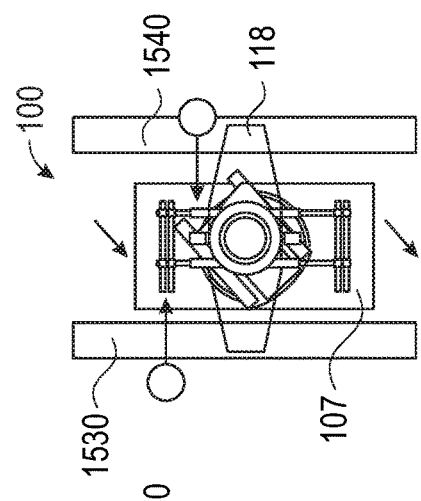
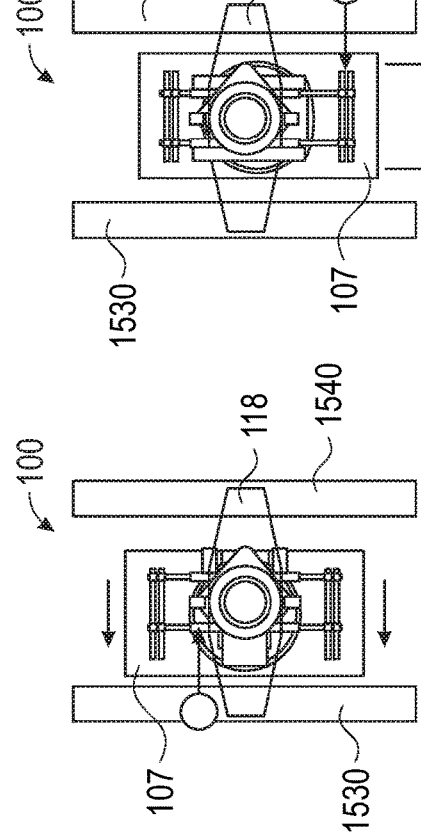

SECTION A-A

STABILIZER FRAME APPARATUSES AND METHODS OF USING SAME

CROSS-REFERENCE TO RELATED APPLICATION

This application is a continuation-in-part of U.S. patent application Ser. No. 14/830,169 filed Aug. 19, 2015 and claims the benefit of Provisional Patent Application No. 62/039,885 filed Aug. 20, 2015, both of which are incorporated by reference herein in their entirety.

TECHNICAL FIELD

The present invention relates to stabilizer frame apparatuses configured to engage a load transporting apparatus and configured to integrate into a load structure for moving heavy loads.

BACKGROUND

Moving extremely heavy loads (at least 100,000 pounds or more per foot) has generally been a complicated task because of the large forces involved in lifting and transporting such heavy loads. When possible, large loads are often transported by disassembling or breaking up the load into multiple smaller loads. However, this break-down and subsequent reassembly process can be very time consuming, especially when a heavy load is only to be moved a small distance, or simply needs to be repositioned.

For heavy loads that need periodic movement or adjustment, devices commonly referred to as "walking machines" or "walkers" were developed. These machines typically move the heavy loads in incremental stages. Walking machines are particularly useful for moving large structures, such as oil rigs, silos, and the like. The oil rigs may need to be moved in order to properly position them over spud holes and well sites in oil fields, or moved to a new location that is undergoing oil exploration.

Walking machines typically use hydraulic lift cylinders to lift the load above a supporting surface, and then move or rotate the load relative to the supporting surface by transporting the load via rollers or tracks in the walking machines. A non-limiting method of using a walking machine to move a heavy load is described and illustrated in U.S. Pat. No. 5,921,336, which is herein incorporated by reference. The '525 patent shows elongated beams under several rollers and lift cylinders, which allows the load from the lift cylinders and rollers to be spread over a large area.

There have been many attempts at maintaining a pre-determined alignment of a load transporting apparatuses when integrated into a load structure. Therefore, it would be desirable to improve and stabilize load transporting apparatuses during movement of a load. In addition, it would be desirable to improve the ability of the load transporting apparatus to maintain a pre-determined configuration and alignment when integrated into a load structure.

BRIEF DESCRIPTION OF THE DRAWINGS

FIGS. 20a-20d depict a load transporting apparatus maintaining a parallel configuration between sidewalls in various positions;

FIG. 23a-23f depicts several positions of a load transporting apparatus engaged with a stabilizer frame apparatus as the apparatuses move between two sidewalls;

SUMMARY

Figure 1:
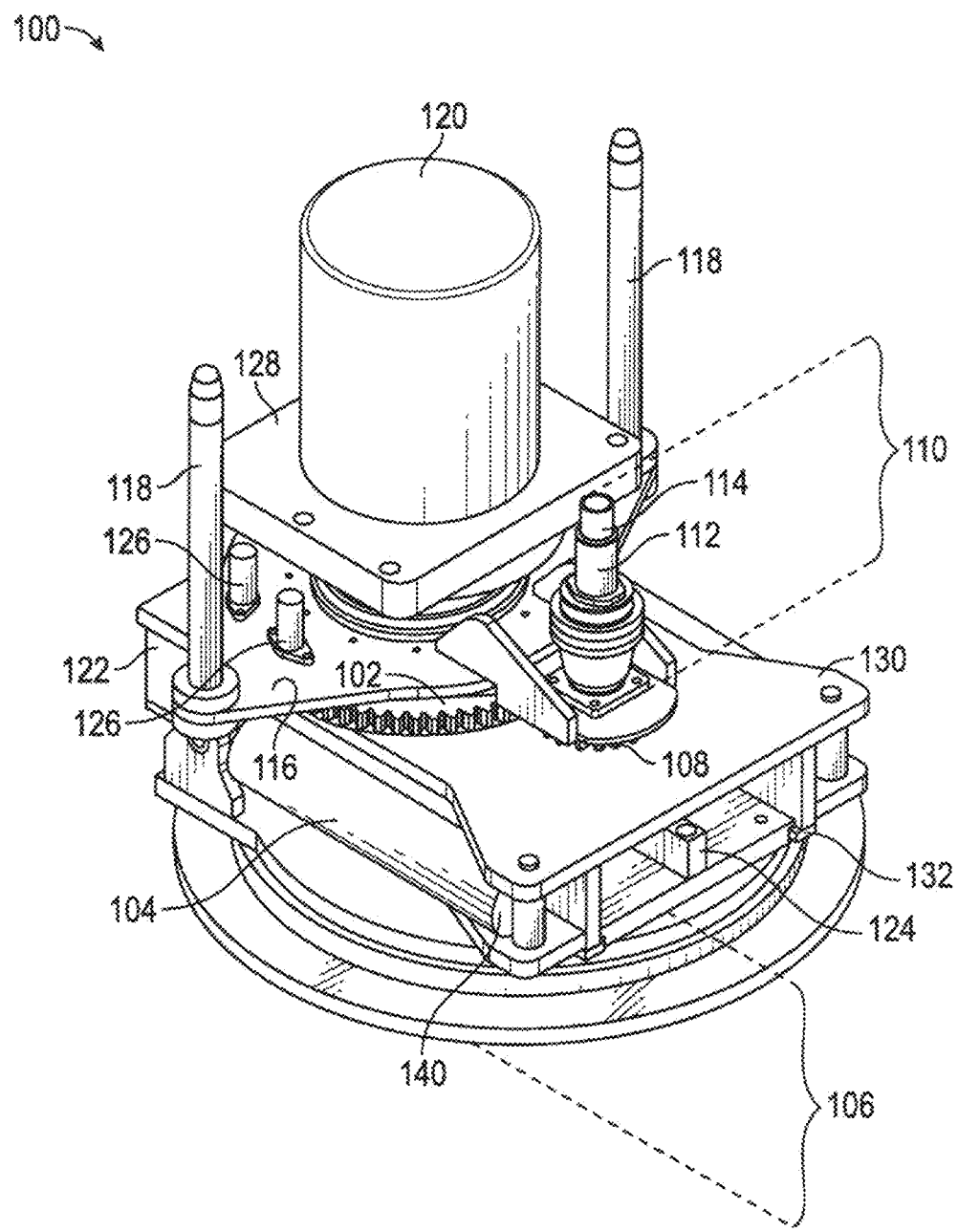
FIG. 1 is an isometric view of a non-limiting embodiment of the load transporting apparatus.

There is provided, in one form, a stabilizer frame apparatus configured for engaging a load transporting apparatus. The stabilizer frame apparatus may have or include a first stabilizer bar and a second stabilizer bar where the stabilizer frame apparatus is configured to operatively integrate into a load structure. The first stabilizer bar may have a first end and a second end, and the second stabilizer bar may have a first end and a second end. The first end of the first stabilizer bar may be operatively coupled to the first end of the second stabilizer bar. Similarly, the second end of the first stabilizer bar may be operatively coupled to the second end of the second stabilizer bar.

There is provided, an alternative non-limiting form of the stabilizer frame apparatus configured for engaging a load transporting apparatus. The stabilizer frame apparatus may additionally (but optionally) have its first stabilizer bar and its second stabilizer bar configured to be freely movable, i.e. in a free state, with respect to the structure supporting the load during movement by the load transporting apparatus. In yet another alternative embodiment, the load transporting apparatus may maintain a substantially parallel configuration between the sidewalls of the load structure during movement.

DETAILED DESCRIPTION

As described above, walkers, or walking machines, are vehicles that are used for transporting very heavy loads, such as entire oil well drilling rigs. Such loads may be sequentially positioned very precisely over spaced-apart well bores, for example. Embodiments of the present concept are directed to load transporting apparatuses, such as walking machines, for moving heavy loads over small distances, such as less than an inch independently to about twenty feet or more per move, with the ability to fine tune the resultant position of the heavy load. For ease of understanding, the terms, "walkers," "walking machines," "walking devices," and "walking apparatuses" are used interchangeably below. Load transporting apparatuses or systems may include one or more walking machines. Additionally, a walking machine's subassembly of components that facilitate movement of the walking machine are referred herein as a "walking mechanism." Walking machines may incorporate one or more walking mechanisms, depending on the specific configuration of a walking machine.

For example, a load transporting system may include multiple walking machines that support a load being carried by the load transporting system. Multiple walking apparatuses may be positioned under or adjacent to an oil rig. A plurality of walking machines may work in concert to support and walk a load. Typically, walking machines may be positioned at least near an edge portion of a load to balance the weight of the load over the various walking machines. In a non-limiting embodiment, the load may be an oil rig, a silo, and the like.

The one (1) or more load transporting apparatus (e.g. a walking assembly) may be affixed to a structure to be moved. The load transporting apparatus may be located within the structure, attachable to the outside of the structure, or any other combination thereof. A structure may include a load and any structural components to attach the load to the load transporting apparatus. All of the feet or assemblies (i.e. all of the load transporting apparatuses) may be moved in unison; alternatively at least one foot (of at least one load transporting apparatus) may be moved in unison with at least another foot. It may be beneficial to move one foot at a time when only a portion of the available feet in an installation may be operated, such as during a 'leveling' function. A leveling function occurs when a load structure must be leveled, which may occur when the apparatus(es) are on a sloped or uneven surface. Each foot may move independently of another foot to allow the walking machine to become level or to allow the walking machine to move across an uneven surface.

Generally a walking machine requires a set of 4 load transporting apparatuses to move or walk a load (e.g. an oil rig or silo); smaller loads may use fewer load transporting apparatuses and larger loads may require more. A load (e.g. and oil rig or silo) may be placed on top of the lifter of the load transporting apparatus and a transport Assembly (e.g. a saddle & rollers, saddle and pads, and the like). The Transport Assembly may move laterally over a track by using one or more actuators. The actuator(s) may be connected generally between a roller housing connected to a track or foot. To walk a load, typically the actuator(s) (e.g. lateral actuators) may extend and retract in a desired orientation and lift and lower a load via the lifter. To change the direction when moving a load, a foot assembly may be connected to a lifter (e.g. a leg assembly) and rotated towards an intended direction.

The rotation of a foot assembly may occur by manually rotating the foot assembly about a vertical axis of a lifter. The rotation may be a function of loose fitting geometry in a coupler location on the lifter that may allow for the foot assembly to rotate freely about its axis in an unloaded state. After change in direction of the foot, a keeper (e.g. a rod, bar, pin, lock, or combinations thereof) may be generally inserted into a receiver location on the foot and passed through a guide area (e.g. a sleeve) affixed to the lift device to help maintain direction. Other walking systems do not provide a means to rotate about the lifter at the lifter's interface while using the keys or flanges interfacing the lifter in conjunction with the roller assembly.

In a non-limiting embodiment, when the lifter extends, the foot assembly or foot portion may move towards the surface (e.g. in a downward fashion), and the load may then be elevated away from the surface (e.g. in an upward fashion). In a non-limiting embodiment, the lifter(s) may be connected to a rotary interlock for engaging various components of a foot assembly and/or portions of lateral transport mechanisms and allowing the rotary interlock to have a controlled range of rotation about a datum (i.e. upon the lifter). The plane of the radial rotation may be somewhat parallel to the surface in a non-limiting instance; alternatively, the plane of radial rotation may occur at an angle to the surface ranging from about 0 degrees independently to about +/−15 degrees in any orientation somewhat perpendicularly relative to the datum of the rotary inlock connection about the lifter and alternatively from about 0 degrees independently to about 180 or 360 degrees in another non-limiting embodiment upon the plane somewhat parallel to the base surface of the foot and about the axis of the datum of connection.

Walking apparatuses may be positioned on a base surface below or adjacent to a load. The walking apparatuses may be attached to the load, and may be positioned above a base surface. The walking apparatuses may be operated substantially simultaneously, or may be operated in intervals depending on the conditions of the base surface and the load that is to be moved. The walking apparatuses may be operated to lift the load above the base surface. The base surface is the surface underneath the foot and/or pad saver of the load transporting apparatus. The base surface is typically the ground, terrain, substrate, rig mat, or other base surface underneath the load transporting apparatus.

The walking apparatuses may be operated to move the load in a variety of directions depending on the desired final location of the load. The walking apparatuses are operated to lower the load to the base surface and to raise the foot portions of the walking apparatuses above the base surface. That is, after the load is positioned on the base surface, the walking apparatuses are further operated so that they are raised above the base surface. Here, the connection between the walking apparatuses and the load may be supported by the walking apparatuses when the walking apparatuses are raised above the base surface. After the walking apparatuses are raised above the base surface, they may be further repositioned for another movement walking step, such as by moving the foot portions of the walking apparatuses to the right so that they are in a position. That is, the base surface touching part of the walking apparatuses (e.g., the foot and related structures) may be moved to the right while the walking apparatuses may be raised above the base surface. After the walking apparatuses have been repositioned, they may be lowered to the base surface. This completes a single walking cycle, and further walking cycles or steps may be performed by repeating the steps described above.

The foot portion may be a variety of shapes, such as but not limited to a circular foot, a square foot, a rectangular foot, a foot with more than four sides, etc. The foot portion may have additional features to allow for connection to other devices, such as but not limited to lateral propulsion travel mechanisms, surfaces, lateral travel mechanism, special attachments to help reduce the realized pounds per square inch of the transport load in an active state to the ground, other support members in which the system operates around and above (in general), and combinations thereof. The surface area of the foot portion may range from about 4,000 square inches (in$^2$) independently to about 6750 in$^2$, or from about 500 in$^2$ independently to about 2500 in$^2$ in another non-limiting embodiment. The foot or feet may be made of steel in a non-limiting embodiment. The foot or feet may be machined, coated, ground, welded, bolted or otherwise configured to interlock together and to connect with the track component as well. The surface area of the foot portion may vary depending on the type (and therefore size) of the load. For example, a full rig of 600,000 lbs would require a larger foot compared to a 50,000 lb load.

The foot portion may rotate to further facilitate movement and/or alignment of the walking assembly relative to the surface. The foot portion may rotate in addition to or in lieu of the lifter. The foot portion may rotate from below a rotary interlock bearing aligned more or less in the relative direction of the lateral travel devices. The rotary interlock bearing may be positioned below the lifter(s) and above the lateral transport devices. The rotary interlock bearing may be used without mechanization, yet still allow the parts of the walking assembly therebelow to rotate relative to its' centerline about the datum. The rotary interlock may also include or work in conjunction with a mechanized member, such as a geared ring, to allow another drive device to rotate the geared ring and thereby generate rotation of the rotary interlock. With the lateral travel devices connected (singularly or in concert) to a side opposite the lifter(s), the lateral components will be able to rotate freely about the datum towards the intended orientation. A rotary interlock may be used in addition to or in lieu of a slewing ring in a non-limiting embodiment.

The rotary interlock may be used with loads ranging from about 50,000 lbs independently to about 1,000,000 lbs, alternatively from about 85,000 lbs independently to about 400,000 lbs, or from about 150,000 lbs independently to about 600,000 lbs in another non-limiting embodiment), dynamic flexibility, low maintenance, and longevity in mind all while maintaining a very small foot print (e.g. a surface area less than about 150 in-sq). The diameter of the rotary interlock may range from about 15 inches independently to about 36 inches, or from about 6 inches independently to about 14 inches. A non-limiting diameter of the rotary interlock ranges from about 8 inches independently to about 10 inches.

A pad saver may be used in conjunction with the foot portion, i.e. coupled to the foot portion, and may be considered a 'shoe' to the foot portion. The pad saver may lessen the pound per square inch (PSI) transfer of a load from the foot portion by creating a larger contact-transfer area, thus helping to preserve and save the integrity of the foot portion, matting, support members, the ground or surface beneath the load transporting apparatus, and combinations thereof. The pad saver may be used individually or a plurality of pad savers may be coupled to a foot portion of the load transporting apparatus. Non-limiting shapes of the pad saver are square, rectangular, circular, ovular, triangular, and the like. The surface area of a pad saver may range from about 5,000 in$^2$ independently to about 10,000 in$^2$, or from about 700 in$^2$ independently to about 3,000 in$^2$. The thickness of a pad saver may range from about 2 inches independently to about 5 inches, or from about 1.25 inch independently to about 2.5 inch in another non-limiting embodiment.

The load transporting apparatus may be used individually for limited applications but will more commonly be used in quantities of 2 or more. Typically four assemblies are used to walk a rig, but it is possible to use more or less depending upon the load and other devices that may be available.

The lifter of the walking apparatus may be attached to a connection frame, which in turn may be connected to a structure supporting the load. In some embodiments, the connection frame may be part of the walking apparatus and in some instances, the connection frame may be connected to the lifter of the walking apparatus. In other embodiments, the connection frame may be separate from the walking apparatus, and may only be temporarily used with the walking apparatus in certain situations. In these embodiments, for example, multiple different connection frames may be built or used with specific load conditions or specifications. Types of connections used for connecting various members or components mentioned herein may be or include, but are not limited to bolts, screws, threading, welding, pinning, bonding, captured fits, slip fits, keys, splined, grooved, wedged, or other connection mechanisms, and combinations thereof.

A portion of a lifter of a walking apparatus may be directly connected to a support frame structured to support a load. The support frame may be considered part of the load in some instances when the support frame is a permanent part of the load structure. For example, in instances where the load is a silo, the metal frame of the silo may be considered the support frame of the load, while also being part of the silo, and hence part of the load. In other cases, the support frame may be an ancillary structure that is only used to stabilize and support the load during movement of the load, such as is typically the case when the load is an oil rig.

The lifter may interface with the load structure to lift a load. After the lifting is complete, the lifter may lower the structure back to the load bearing surface(s). More than one lifter may be employed per walking assembly depending on factors, such as but not limited to space consideration, load consideration, stability concerns, and the like. Non-limiting examples of the lifter include hydraulic cylinders, electromechanical cylinders, pneumatic cylinders, levers, cams, geared configurations, rack-and-pinion systems, systems involving a cable, pulleys, rollers and other such components, inflatable bags, expandable bladders, screw rods or columns (e.g. threaded shafts), eccentric rollers, shafts, or any other type of equipment capable of lowering, extending, and retracting a load. Although lifters are typically a cylindrical shape, any shape may be used as long as the lifter can support and lift a load according to the disclosure herein.

The walking apparatus may also include a travel mechanism that is connected to the track or foot and coupled to the roller assembly such that when the travel mechanism is activated, the roller assembly moves relative to the roller track. The travel mechanism may include two transverse cylinders. Here, the transverse cylinders of the travel mechanism may balance the load being moved by the movement assembly over the track. In other embodiments, one transverse cylinder, or three or more transverse cylinders may be used to move the movement assembly relative to the track. In other embodiments, the travel mechanism may include different movement structures, such as pulleys, levers, winches, tracks, etc. In a non-limiting embodiment, the roller assembly may include a XNT, XNTW (or similar) series roller assembly from Hillman Rollers. The roller assembly reduces the forces required to laterally propel a load about the track above the surface with a low coefficient of friction. For example, Hillman Rollers (e.g. Model 150-XNTW) may transport a load with a coefficient of friction of about 0.05.

A lifter, such as hydraulic jack, may be connected between the movement assembly and the load-bearing frame. When the lifter is activated, the movement assembly, the roller track, and the foot may be lifted above the base surface or ground as a single unit. This is due in part because the roller assembly, which is secured to the lower end of the travel mechanism, is captured by the roller track, as discussed above.

The distance of travel by the foot may be limited by the operable travel, or throw, of the transverse cylinders. Because the lateral travel is limited, the tracks may only need to be long enough to accommodate the corresponding distance traveled by the movement assembly.

The lifter may be activated (i.e., the cylinder rod of the hydraulic jack may be forced out of the lift cylinder) causing the foot to engage the base surface. As the lifter continues to operate, the ground-engaging portions of the load-bearing frame may be lifted off of the base surface, so that the entire weight of the load is then supported or shared among each support foot.

A load may be supported by as many walking apparatuses that may be needed to successfully move the load, such as from one load transporting apparatus to up to ten or more load transporting apparatuses. More than two walking apparatuses may be coupled to the same support foot in another non-limiting embodiment. Orienting the left two (or more) walking machines in a first direction and orienting the right two (or more) walking machines in a second complementary direction, may allow the load to be moved and steered in a complimentary-steering mode. Orienting the left two (or more) walking machines in a first direction and orienting the right two (or more) walking machines in a second orthogonal direction, may allow the load to be moved and steered in a simple-steering mode. Orienting first diagonally opposite walking machines in a first direction and orienting second diagonally opposite walking machines in a second direction, may allow the load to be moved and steered in a spin-steering mode. Orienting the walking machines in a direction perpendicular to the orientation of the feet may allow the load to be moved in a vertical or perpendicular direction relative to the orientation of the feet. Steering in this manner would allow for strong left in direction, a strong right in direction, a u-turn, and the like.

A walking apparatus may also include a position feedback sensor that is configured to detect the position of the track or other datum/reference relative to the foot. A propulsion device, such as a motor to rotate a roller track relative to an intended direction of travel. The propulsion device may include a rotatable gear configured to interface with gear teeth of a bull gear or geared ring about the vertical axis of the datum beneath, relative, or on plane with the rotary interlock, e.g. above the track above the track surface. In some embodiments, the propulsion device may include a DC motor operated on batteries, or other direct current power supplies, while in other embodiments the propulsion device may include an AC motor operated from a generator or other types of alternating current power supplies. In other embodiments, a hydraulic motor or other types of electro/mechanical assistance devices may be used as the propulsion device.

Other forms of power supply to the walking machine system and/or individual load transporting apparatus(es) may include a hydraulic power supply, an electric power supply, a pneumatic power supply, and combinations thereof. Alternating current (AC) electrical components may be powered with single or three phase power in a range of voltages from 110 VAC to 575 VAC as standard; other ranges may also be configured to work with the power supply, if needed. Direct Current (DC) electrical components may be powered with single or three phase power in a range of voltages from −24 VDC to +24 VDC as standard; other ranges in DC power may be configured to work with the power supply, if needed. Hydraulic and pneumatic power supplies may be driven by electric motors, gasoline engines, diesel engines, and combinations thereof.

An operator may be able to set a specific distance of travel for the motor (e.g., such as in embodiments where the motor is a stepper motor). Alternatively, the propulsion device may include forward and backward cycles so that an operator can fine tune a position of the track. In yet other embodiments, a position feedback sensor may be used to identify a position of the track. Here, the operator may only have to type in an angular displacement between the track and the foot and allow the motor and/or feedback sensor to determine a correct position and move the roller track to that determined position. Such motor(s) and/or sensors may be present within a driven swing drive with feedback, as described below. A locking mechanism may be used to lock the track in place once the desired orientation is reached.

A track positioned on a foot may use a cylinder propulsion system to rotate it relative to the foot. Here, hydraulic or other cylinders may be connected to attachment points on the edges of the track via cables or other connection devices. Depending on which transverse cylinder is activated, the track may be rotated relative to the foot. Slewing rings, and especially slewing rings with swing drives or worm geared drives, are a conventional means of achieving this type of rotation. However, due to the size constraints found in and on most walking systems, the heavy loads to be walked, and/or the dynamic changes to the center of gravity of a load, it may not be practical or feasible to install a slewing ring into a system to handle the loads.

Instead, a rotary interlock may allow a 360 degree lateral rotation, and/or safe loading and/or unloading of the foot. Used in conjunction with a rotary drive device, manual or non-manually powered, the foot may be safely rotated within the requirements of the orientation, the foot may help to disperse a load, the foot may have flexibility and dynamic flexibility beyond that of a conventional slewing ring, and the foot may fit into a small envelope of space. The rotary interlock may safely support and lift up to a 600,000 pound load when the rotary interlock has only a diameter ranging from about 14 inches independently to about 30 inches, alternatively from about 10 inches independently to about 12 inches. The thickness of the rotary interlock may range from about 2 inches to about 5.5 inches, alternatively from about 1 inch independently to about 3.5 inches. In a non-limiting embodiment, the rotary interlock may have a diameter of about 19 inches and may be about 4 inches thick.

The rotary interlock is contrasted to a conventional slewing ring here. The diameter of a slewing ring for safely supporting and lifting a 2.4 million pound load would have to be greater than 72 inches, and the thickness of the slewing ring would have to be in excess of 5 inches. Thus, in a tight and confined environment (i.e. less than 3,200 square inches), it is not practical to use a slewing ring that is appropriately rated for the above said loads mentioned in the example.

It has been discovered that walking assemblies may be designed to be hydraulic walking assemblies, electric walking assemblies, remote controlled walking assemblies, pneumatic assemblies, and the like. Human to Machine Interfaces for control, operation, and servicing can be achieved through valves, levers, push buttons, joysticks, selector switches, computers, PLCs, touch panel screens, wireless or tethered remote controls, and other control and control panels devises. System training, logging, troubleshooting, servicing, and other such needs can be achieved via computers. Non-limiting feedback mechanisms to and from a walking machine system can be in the form of encoders, proximity sensors, magnetic pick-ups, switches, potentiometers, transducers, accelerometers, inclinometers, GPS, ultrasonic, infrared, optical, and other such devices. Non-limiting signals used in communication with the walking machine may be in milliampers, voltage, can-bus protocols, profibus protocols profinet protocols, SSI, industrial Ethernet, other similar methods, and combinations thereof. Remote controls and remotely activated, monitored, or controlled devices can use any combination of the above items if needed, and the signals may be transmitted via broad spectrum, fixed frequency, WIFI, Bluetooth, other conventional wireless radio transmission protocols, and combinations thereof. Such walking assemblies may allow for better safety of workers around drilling rigs because such workers are no longer having to manually rotate the rotational devices to move the load with the walking assembly.

Now turning to the Figures, FIG. 1 is an isometric view of a non-limiting embodiment of the load transporting apparatus 100. The load transporting apparatus 100 is configured to move a load (not shown) over a surface in one or more incremental steps, each including a loaded traverse and an unloaded traverse. The load transporting apparatus 100 may include a lifter 120, at least one origin stabilizer 118, a driven swing drive 110 with feedback, a pinion drive gear 108, a saddle housing 122, a bull gear 102, a transverse cylinder 104, a foot 106, a rotary interlock (see FIG. 3), and combinations thereof in a non-limiting embodiment.

In a non-limiting embodiment, the swing drive 110 may have an encoder (feedback) configured to be included in the swing drive or otherwise connectable to the swing drive for auto-walking the load transport apparatus. In other embodiments, the swing drive may have no feedback or encoder. In yet another non-limiting embodiment, the load transporting apparatus does not have a swing drive or encoder/feedback. In the latter instance, the load transporting apparatus may move with only a hydraulic motor. Should the load transporting apparatus be unable to auto-walk for some reason (e.g. a mechanical/electrical defect), the load transporting apparatus may be hand driven by applying manual force to the pinion gear driven against the geared ring of the load transporting apparatus.

The load transporting apparatus 100 may have an optional pad saver 107 underneath the load transporting apparatus 100 to increase or enlarge the 'footprint' of the load transporting apparatus 100 and positively impact and/or improve the load bearing surface area. The pad saver may allow for a larger weight displacement than would otherwise be afforded to a foot 106 in the absence of the pad saver 107. The foot 106 may rest on the pad saver 107. The foot 106 and/or the pad saver 107 may allow the load transporting apparatus 100 to support a heavier load, especially when the diameter (also known as a working area or envelope by those skilled in the art) of the load transporting apparatus 100 is small in a non-limiting embodiment. In a non-limiting embodiment, the foot 106 and/or the pad saver 107 may rotate relative to the action of the load transporting apparatus 100.

The load transporting mechanism 100 may support a load of as much as 400,000 pounds to about 600,000 pounds or more per 'foot' of the walking assembly. The diameter of the foot 106 may be considered the diameter of the load transporting apparatus 100. The foot 106 may be divided into a multi-pieced foot for easier transport and/or a means for reducing costs. As a non-limiting example, the foot 106 depicted in FIG. 1 has three pieces therein; however, the foot 106 may comprise from one foot component to as many components needed to support the load transporting apparatus 100. The foot 106 may be connectable to the saddle housing 122.

The saddle housing 122 is discussed in more detail in FIGS. 5A through 11. An optional guide 124 is shown between an upper saddle housing 130 and a lower saddle housing 132. The optional guide 124 may be attachable to the track of a movement assembly 134 (See FIG. 8) in a non-limiting embodiment. The optional guide 124 may be in between two rollers or pads within a movement assembly 134 (See FIG. 8). The lower saddle housing 132 may couple the track 312 to the saddle housing 122. In a non-limiting embodiment, the track 312 is removed, so the lower saddle housing 132 may couple the foot 106 to the saddle housing 122. See FIG. 13.

At least one transverse cylinder 104 may be connectable between the upper saddle housing 130 and the lower saddle housing 132. A first side 140 of the transverse cylinder may be connectable to the saddle 122. In a non-limiting embodiment, the traversing cylinder(s) may connect the saddle housing 122 to the track 312 and/or the foot 106. In a non-limiting embodiment, the load transporting apparatus 100 may have at least two or more transverse cylinders 104.

In a non-limiting embodiment, the load transporting apparatus may have at least one origin stabilizer 118; two origin stabilizers 118 are depicted in FIG. 1. The origin stabilizer(s) may keep a motor 112, an interconnector 320, and a driven swing drive with or without feedback 110 in a relatively stable directional orientation relative to the load structure in order by serving as an origin of bearing in direction, controls, targeting, locating, alignments, and the like. In a non-limiting embodiment, the origin stabilizers (s) may be attachable to the master or load-bearing frame (not shown) via a coupler 119 (See FIG. 3), which may be a trunion in a non-limiting example. In a non-limiting embodiment, an origin stabilizer 118 may be connectable to a transverse cylinder 104. In FIG. 1, the cross headplate 116 may be attachable to either the origin stabilizer 118 and/or the transverse cylinder 104 and/or the lifter 120. The origin stabilizer(s) is depicted as a rod in this non-limiting embodiment; however, the origin stabilizer(s) may take any shape possible as long as the origin stabilizer(s) serves as an origin of bearing.

The cross headplate 116 may be connectable to the rotary interlock in a non-limiting embodiment to ensure a positive couple to the lateral propulsion and the relationships of the drive train and the drive gear. The cross headplate 116 may serve as a stable location to mount a number of feedback controls to be used for rotation and/or other measures. Holes may be added to the cross headplate 116 to allow for manual override controls, locking provisions, etc. In another non-limiting embodiment, the cross headplate may be configured to float relative to the movement of the lifter, while maintaining a relatively stable orientation to the lift structure.

The cross headplate 116 may have at least one locking mechanism 126 thereon. In a non-limiting embodiment, there are at least two locking mechanisms 126. The locking mechanism may be configured to couple the cross headplate to the apparatus. The cross headplate 116 may have a swing drive holder 111 attachable thereto. The swing drive holder 111 may support a driven swing drive with or without feedback 110, which may be hydraulic, electric, encoded, and combinations thereof. In the non-limiting depiction of FIG. 1, the driven swing drive with or without feedback 110 may include an optional motor 112, and an optional encoder 114. The bottom side of the swing drive holder 111 may have a pinion drive gear 108 attachable thereto. The pinion drive gear 108 may be suitable in geometry to match the bull gear 102. In a non-limiting embodiment, the bull gear 102 and/or the pinion drive gear 108 may be substituted for sprockets, pulleys, wheels, and other transmission components, and combinations thereof. The bull gear (e.g. geared ring) 102 may be placed about (or around) the radial axis of a rotary interlock, and a pinion gear may interface with the bull gear. The bull gear may be configured so that when the pinion gear is activated, the bull gear may remain in relatively the same position during operation. The force generated between the driven pinion gear may react upon the bull gear causing the bull gear to tend toward movement or rotation. The rotary interlock may rotate freely about the intended axis. This combination may be similar to the resultant function of a swing drive with a geared profile yet no swing drive is required; the configuration of the bull gear may allow for greater load handling capacity and still afford measured control and freedom in rotation.

The pinion drive gear 108 may be activated when the driven swing drive (optionally with feedback) 110 receives a signal to activate the pinion drive gear 108. The pinion drive gear 108 may drive the bull gear 102. The bull gear 102 may have a piston rod (FIG. 3) going therethrough where the piston rod goes through about the center of the bull gear 102. The piston rod may extend and retract from the cylinder body by way of hydraulic power in a non-limiting embodiment.

The bull gear 102 may rest on the upper saddle housing 130. At least one gear tooth of the bull gear 102 may be engaged with at least one locking mechanism 126 to stop or lock the turning of the bull gear 102. The upper saddle housing may be connected to a portion of the rotary interlock to allow the drive gear to be mounted thereon in a location around the rotary interlock. This provides for an axial datum of rotation. The movement assembly, e.g. the saddle (see FIGS. 5A and 5B) may enable the walking assembly to travel over a track (and foot) via rollers or low friction pads, and/or rotated about an axis of the rotary interlock to achieve a change in direction or orientation (e.g. alignment).

Figure 3:
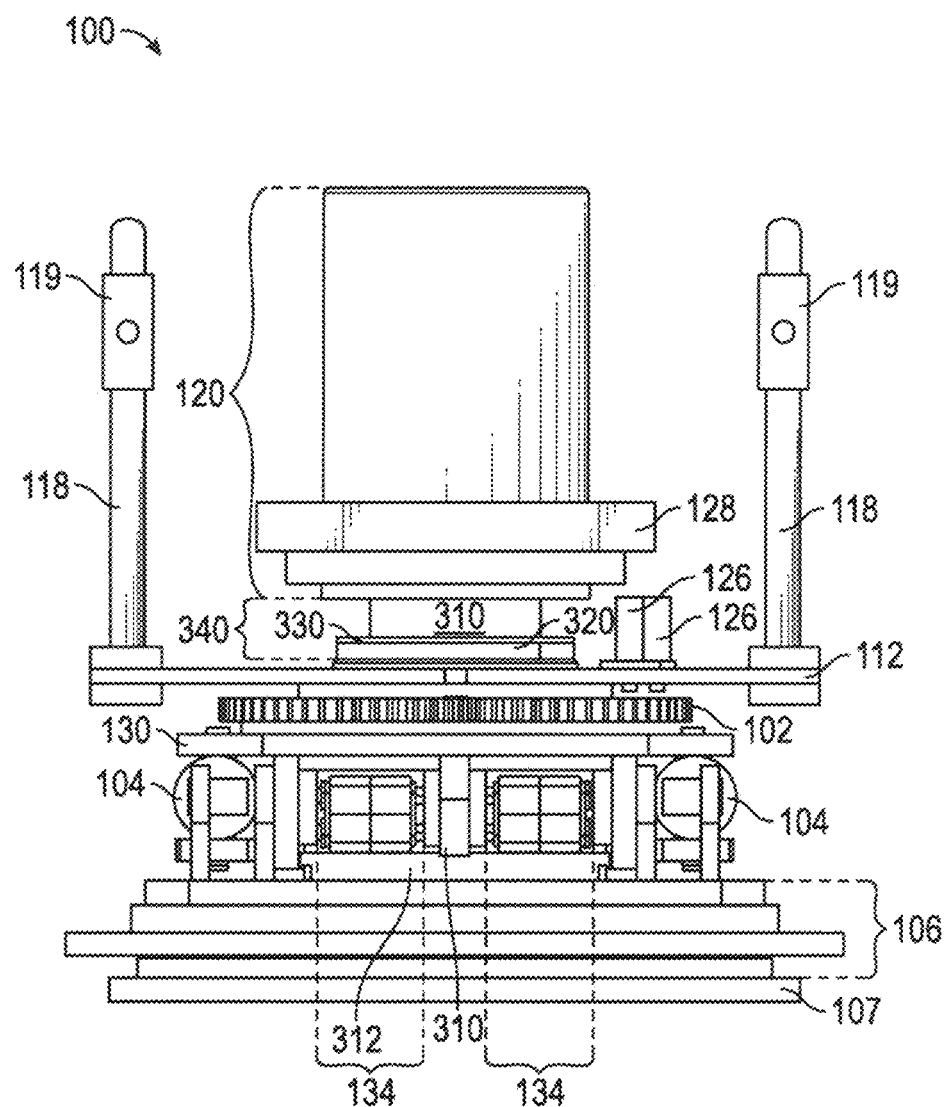
FIG. 3 is a front view of the load carrying apparatus.

The piston rod 310, the interconnector 320, and the optional retainer keeper 330 are depicted and discussed in more detail in FIG. 3. The piston rod 310, the interconnector 320, and the optional retainer keeper 330, may each be made of metal (e.g. steel), plastic, rubber, and the like, and combinations thereof.

The load may rest on the lifter 120, which may have or include an optional fastener 128. The optional fastener 128 support or connect the load transporting apparatus 100 to the load-carrying framework (not shown).

Figure 2:
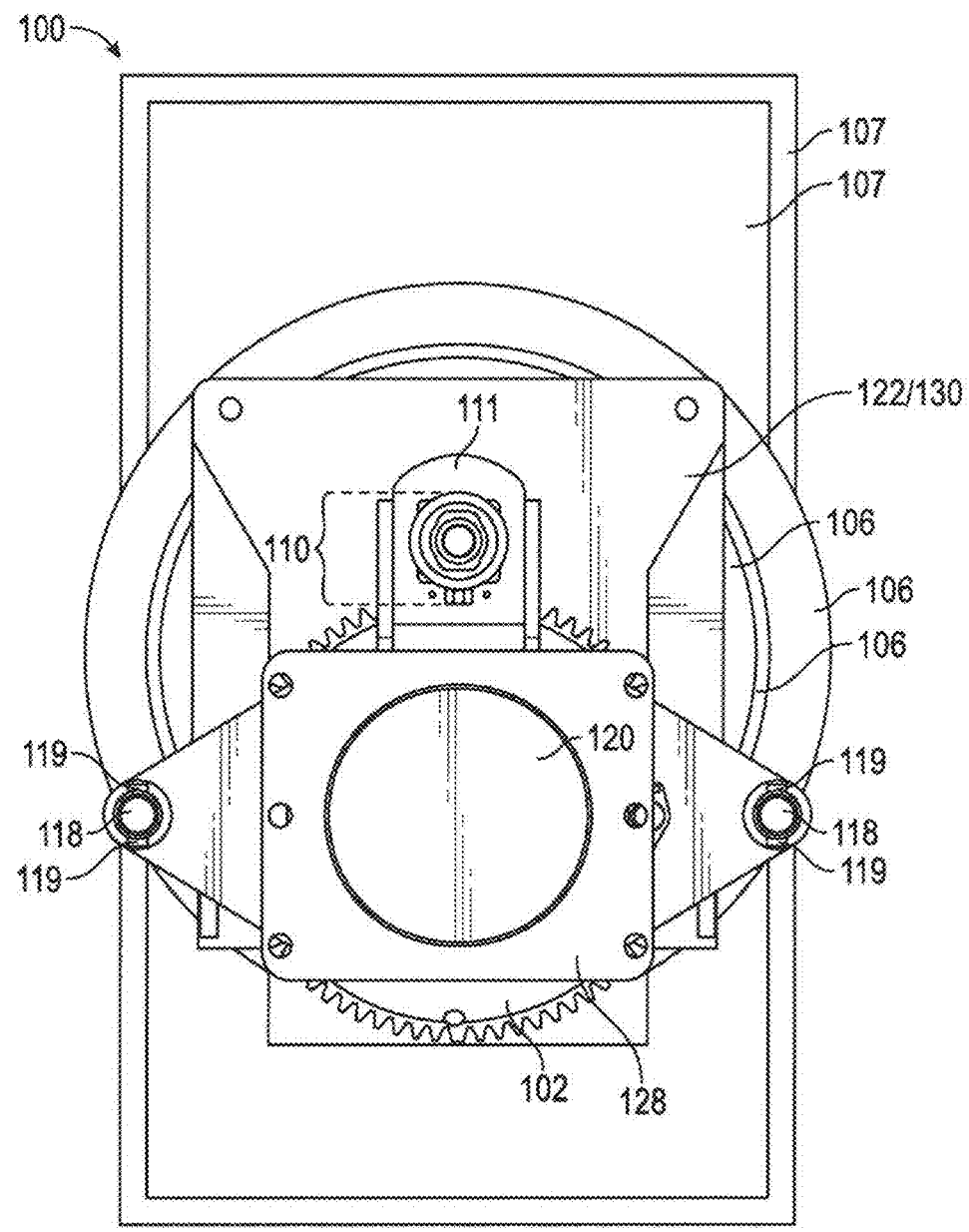
FIG. 2 is a top view of the load carrying apparatus.

FIG. 2 is a top view of the load carrying apparatus 100, i.e. the visible parts include a lifter 120, origin stabilizers 118, an origin stabilizer coupler 119, a bull gear 102, a driven swing drive with optional feedback 110, a swing drive holder 111, a foot 106, an optional pad saver 107, an optional fastener 128, and the upper saddle housing 122/130.

FIG. 3 is a front view of the load carrying apparatus 100 to further illustrate the piston rod 310, the interconnector 320, and the optional retainer keeper 330. The piston rod 310 may be connected to a movement assembly 134. The movement assembly 134 may have a movement housing (shown in more detail in FIGS. 8 and 10). As the pinion drive gear (FIG. 1) rotates the bull gear 102, the piston rod 310 may acquire a vertical movement. Such vertical movement by the piston rod may activate the movement assembly 134 and thereby move the load in a direction by movement of the load transporting apparatus 100.

Figure 4:
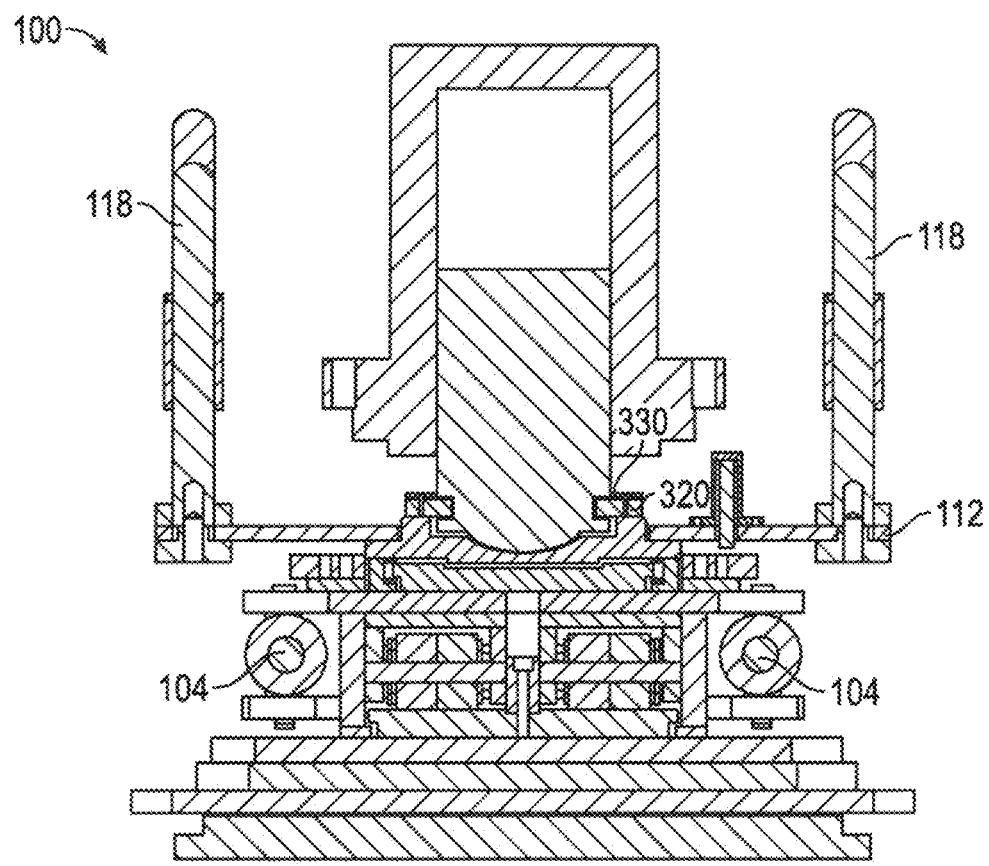
FIG. 4 is a front view of another non-limiting embodiment of the load transporting apparatus.

FIG. 4 is a front view of another non-limiting embodiment of the load transporting apparatus 100.

Figure 5A:
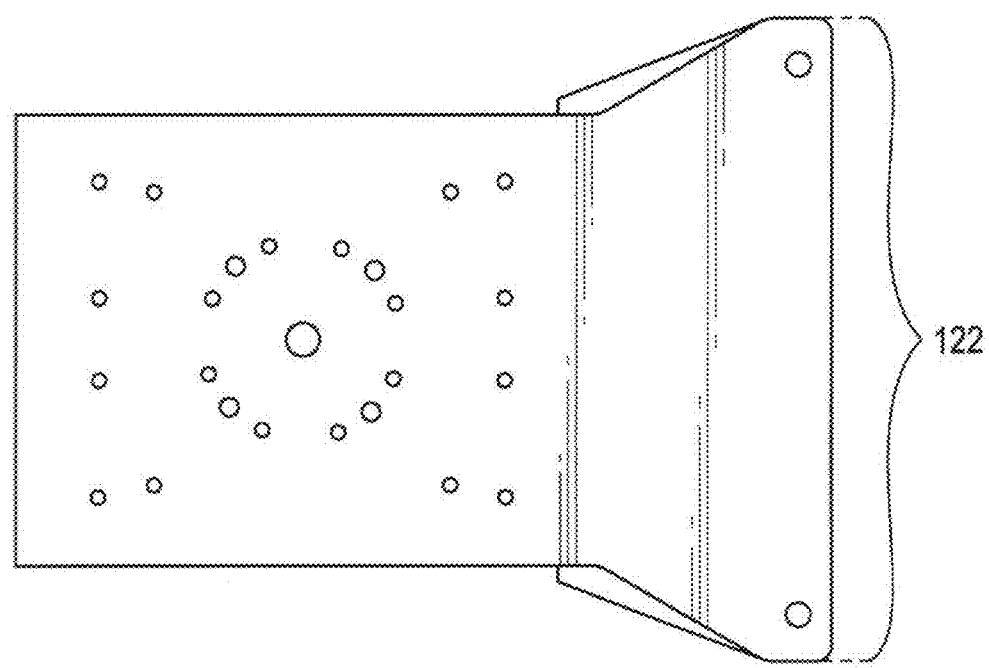
FIGS. 5A-5B depict non-limiting embodiments of a saddle housing.
Figure 5B:
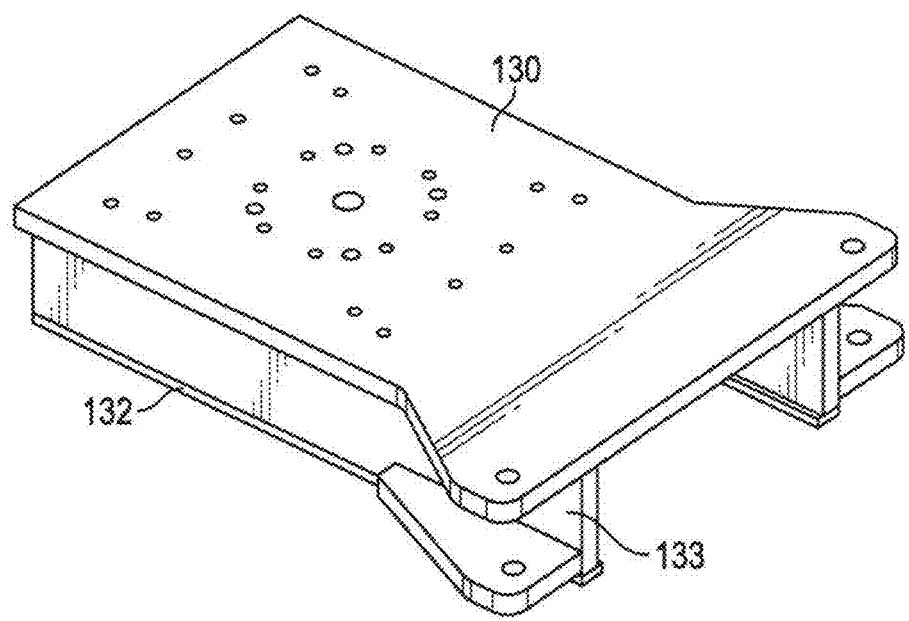

FIG. 5A-5B depict non-limiting embodiments of the saddle housing 122. An upper saddle housing 130, a lower saddle housing 132, and a side saddle housing 133 are shown.

Figure 6:
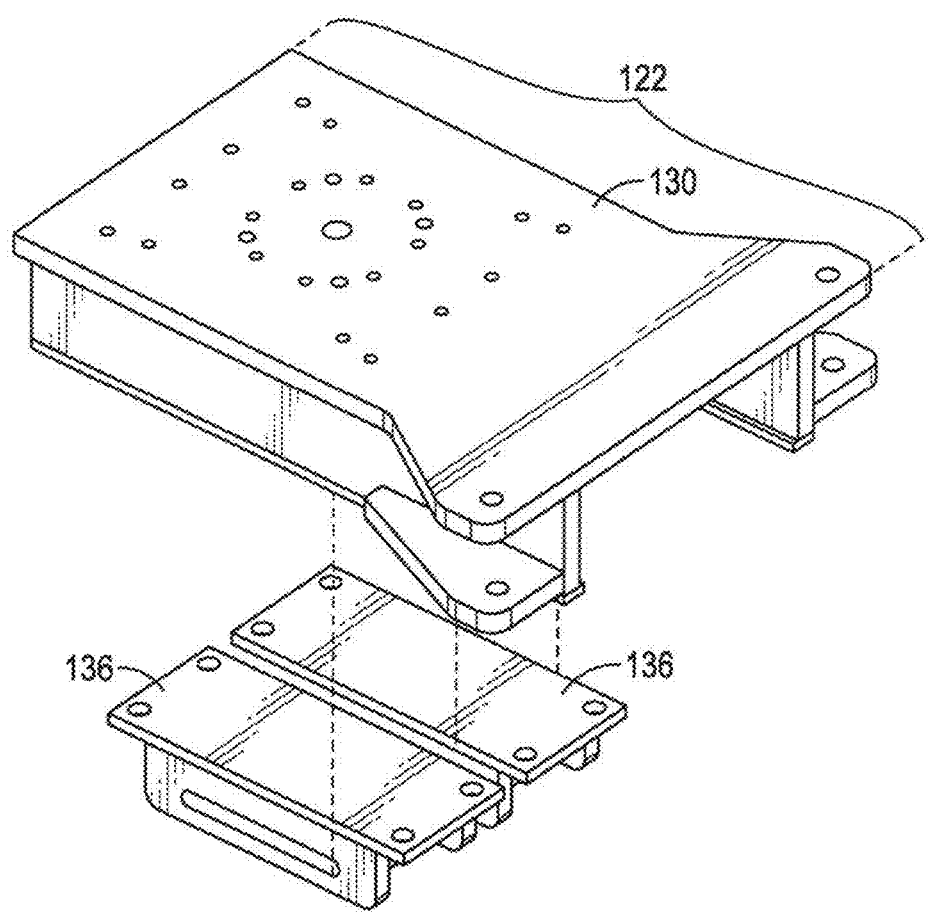
FIG. 6 is a non-limiting depiction of a movement housing attachable to the underside of the upper saddle housing.

FIG. 6 is a non-limiting depiction of how the movement assembly 136 may be attachable to the underside of the upper saddle housing 130.

Figure 7:
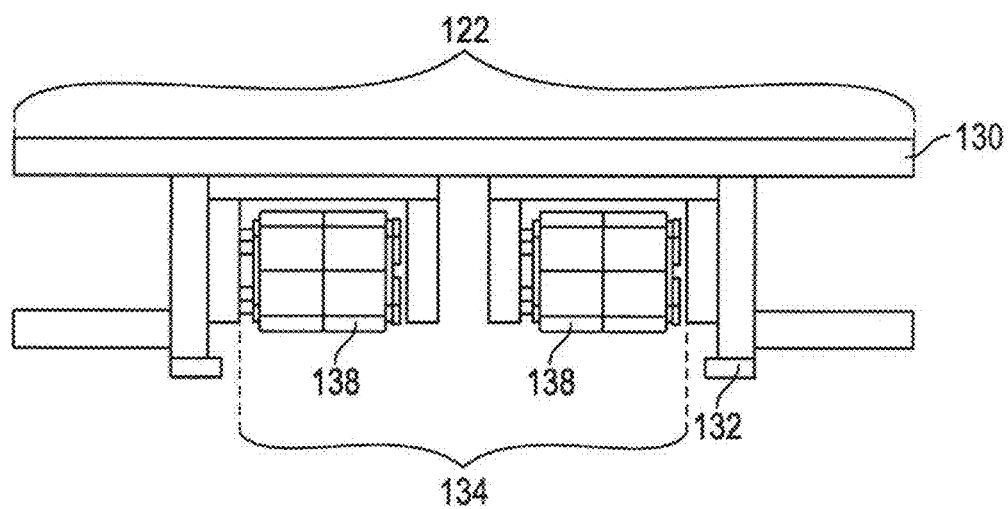
FIG. 7 is a front view of a non-limiting embodiment of a saddle housing with the movement housing attached thereto.

FIG. 7 is a frontal view of a non-limiting embodiment of the saddle housing 122 with the movement housing 136 attached thereto. The movement housing 136 may include at least one low friction device 138 therein for moving the load transporting apparatus 100. In a non-limiting embodiment, the friction coefficient of the low friction device is as low as possible. FIG. 7 depicts rollers 138 as a non-limiting example of the movement assembly 136; however, the movement assembly 136 may be any mechanism having a low coefficient of friction. In an alternative non-limiting embodiment, FIGS. 8 and 9 depicts at least one pad 840 as non-limiting examples of the low friction devices within the movement assembly.

Figure 8:
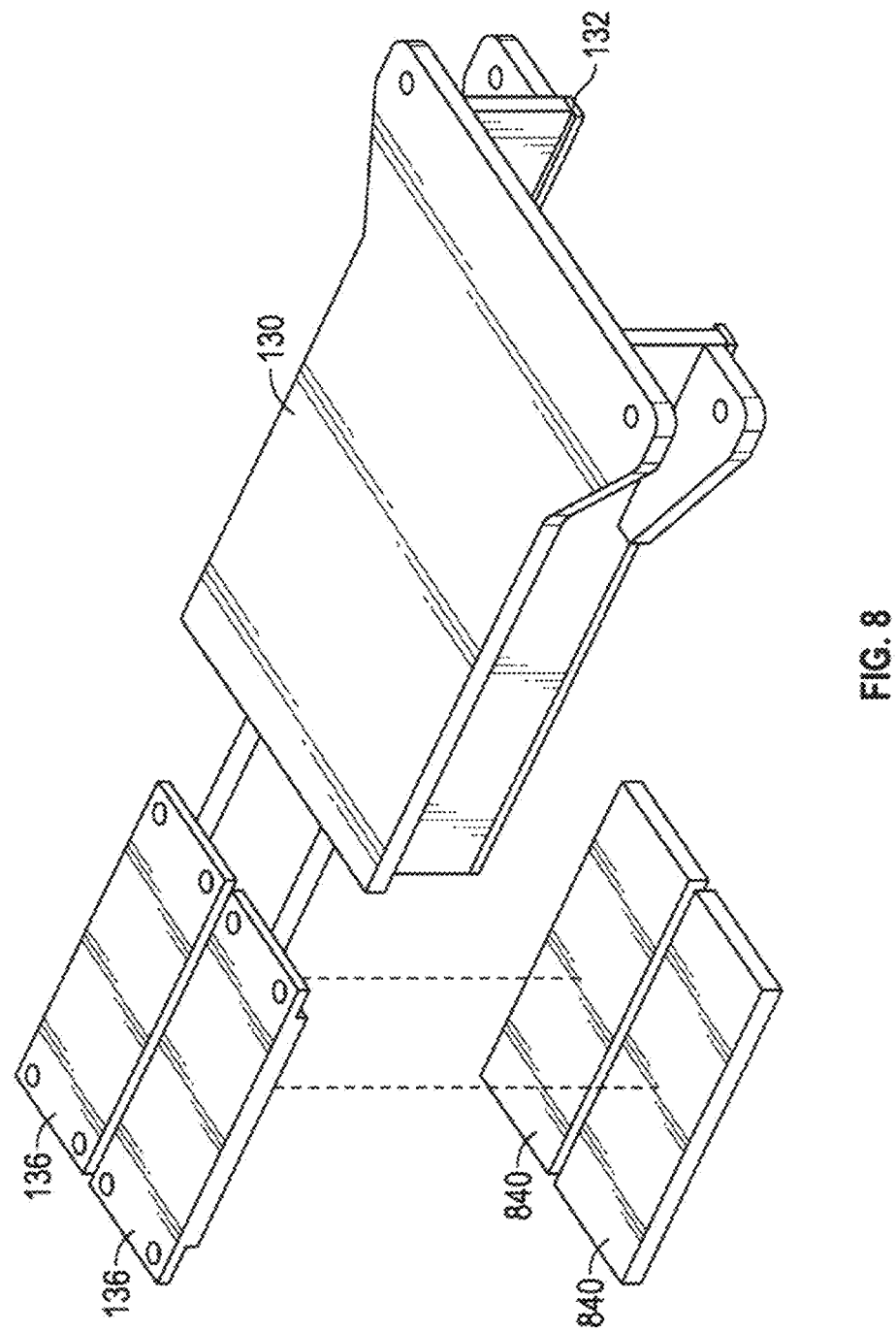
FIG. 8 is an isometric view of a non-limiting embodiment of a movement housing placed within a saddle housing.

FIG. 8 is an isometric view of a non-limiting embodiment of a movement housing 136 placed within the saddle housing 122. The movement housing 136 may be placed into the saddle housing 122 from any side; here, the movement housing 136 is depicted as sliding into the back side of the saddle housing 122. The movement housing may be attachable to at least one pad 840. The pad(s) 840 are depicted as being attachable to the underside of the movement housing 136. In a non-limiting embodiment, the pad 840 may be plastic, rubber, a plastic or rubber composite, and combinations thereof. The movement housing 136 may be or include a pad shoe to anchor the pad(s) 840 to the saddle 122, but to also bear some of the force from the pad(s) 840. By including pad shoe(s), the lifetime of the pad(s) 840 may be extended.

Figure 9:
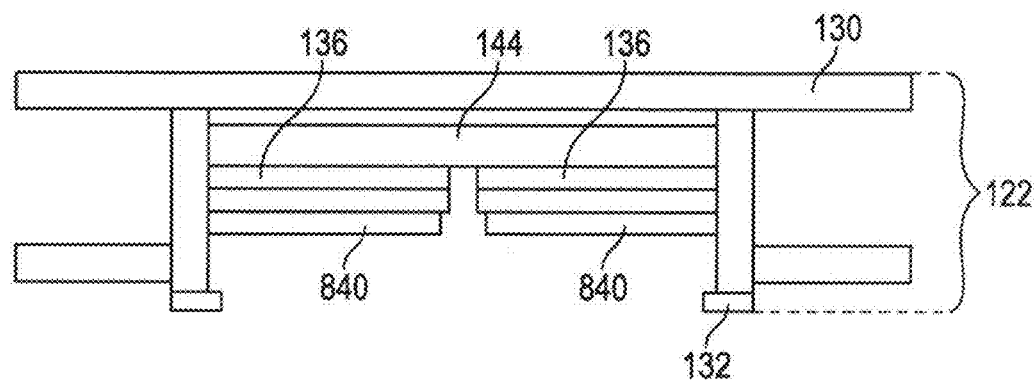
FIG. 9 is a front view of a non-limiting embodiment of a saddle housing where a movement housing and pad(s) are in place between a top saddle housing and a bottom saddle housing.

FIG. 9 is a front view of a non-limiting embodiment of a saddle housing 122 where a movement housing 136 and pad(s) 840 are in place between the top saddle housing 130 and the lower saddle housing 132. In a non-limiting embodiment, an optional pad retainer connection plate 144 may be attachable to the underside of the top saddle housing 130. The optional pad retainer connection plate 144 may provide additional anchoring of the movement housing 136 to the saddle housing 122.

Figure 10A:
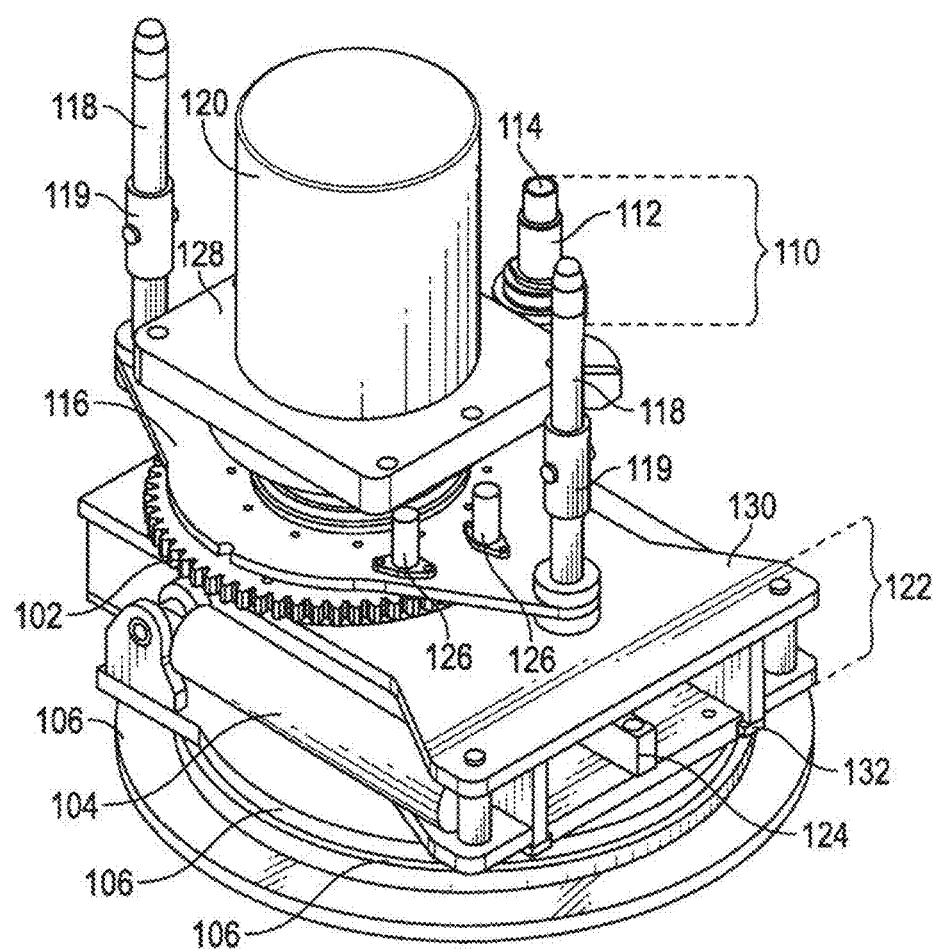
FIGS. 10A-C are isometric views of the load transporting apparatus where a transverse cylinder and a lifter are in various states (i.e. expanded or retracted)

FIG. 10A is an isometric view of the load transporting apparatus 100 where the transverse cylinder 104 is in a retracted state, and the lifter 120 is in a retracted state.

Figure 10B:
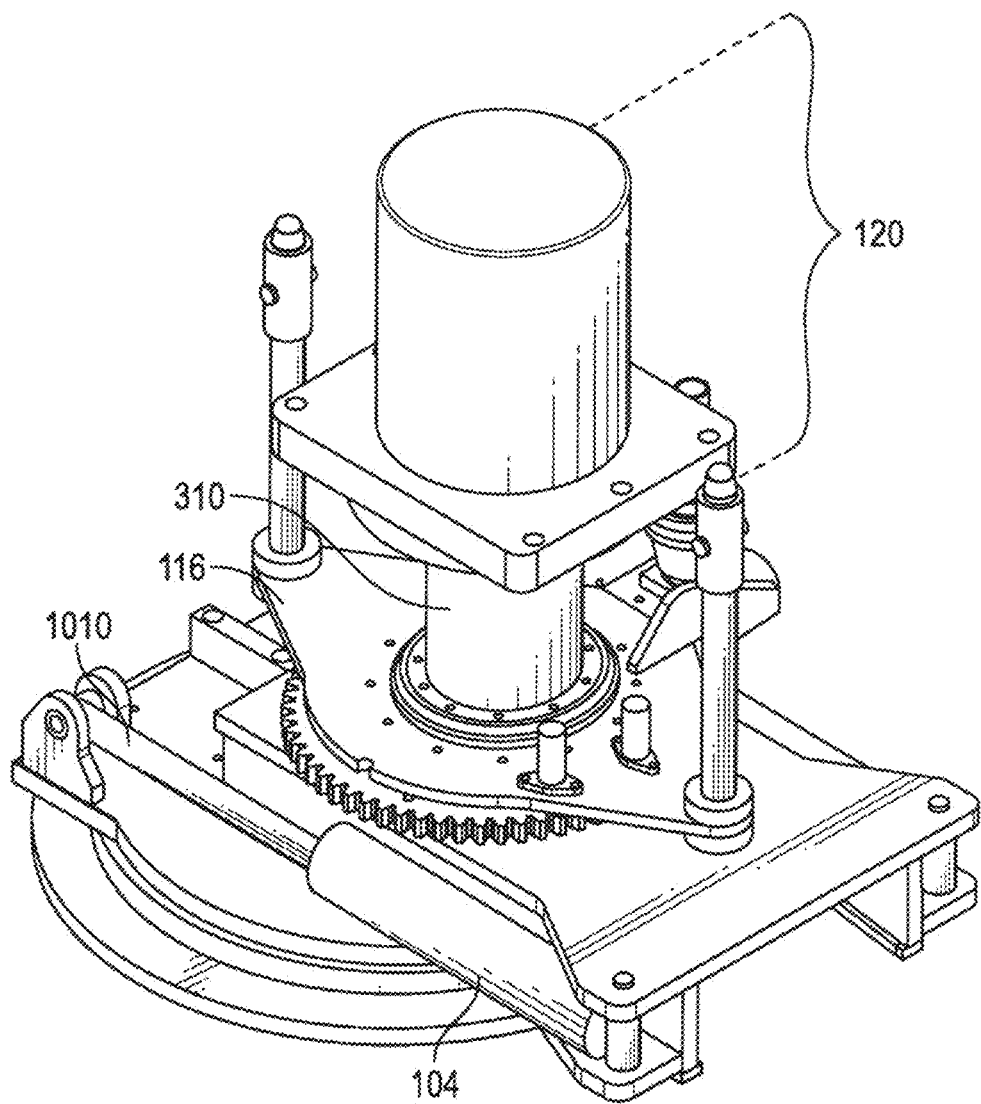

FIG. 10B is an isometric view of the load transporting apparatus 100 where the transverse cylinder 104 may be in an extended state. In addition, the lifter 120 is in an extended state, which exposes the piston rod 310. When the load transporting apparatus 100 is in an extended state, the orbital plate 116 may be turned with the bull gear (i.e. geared ring) 102. The orbital plate 116 is disposed on top of the rotary interlock. The bull gear 102 may turn the load transporting apparatus 100 in an amount of degrees ranging from almost 0 to 360 degrees. A variety or plurality of diametric hole patterns may be employed on the bull gear 102, so the bull gear 102 may align with rotational and/or locking requirements of the load transporting apparatus 100.

Figure 10C:
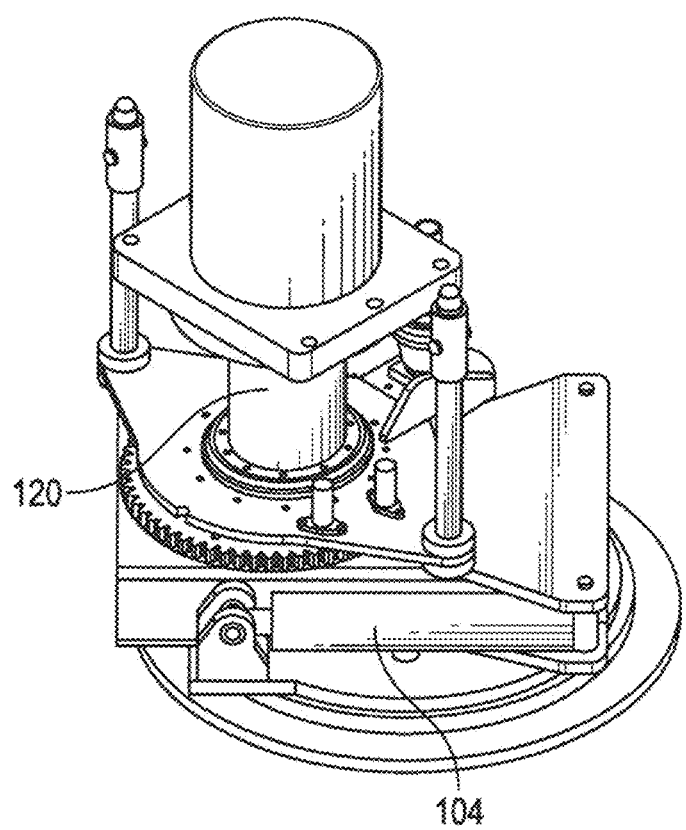

FIG. 10C is a side view of the load transporting apparatus 100 where the transverse cylinder 104 is in a retracted state, but the lifter 120 is in an extended state.

Figure 11:
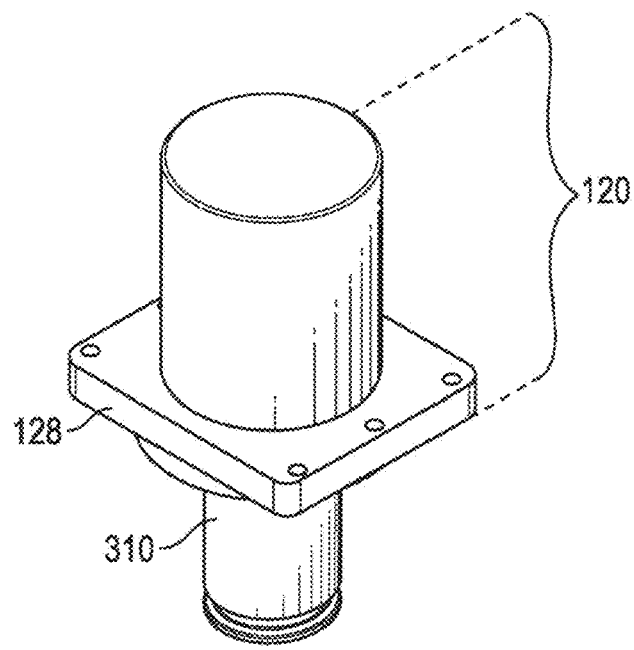
FIG. 11 is an enlarged view of a lifter and a piston.

FIG. 11 is an enlarged view of the lifter 120, and the piston 310. The optional fastener 128 is shown as a mounting flange. The optional fastener 128 may be located at any location along the lifter 120, although it is shown at one end of the lifter here. The optional fastener 120 may be round or rectangular in shape.

Figure 12:
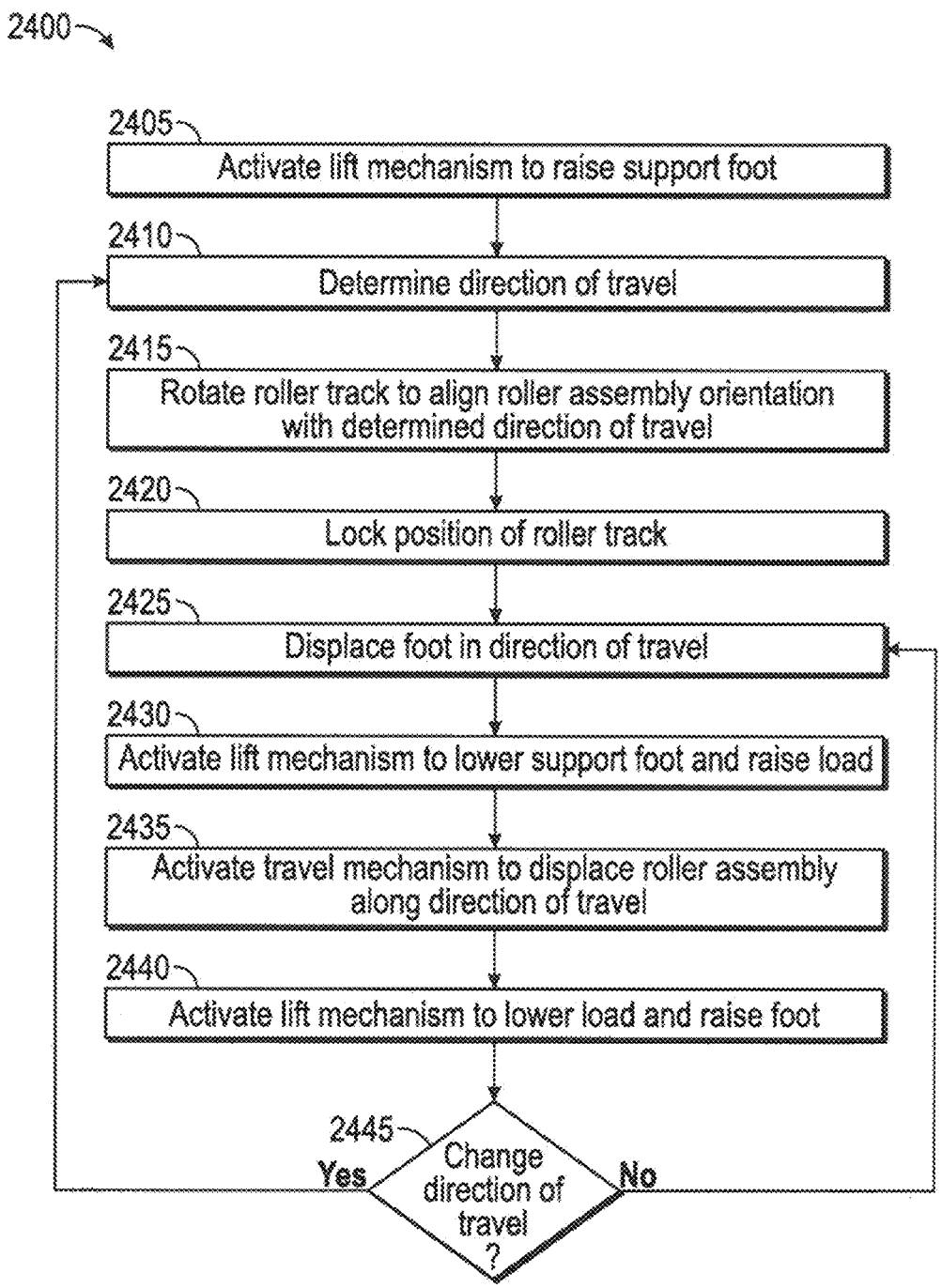
FIG. 12 is a flow diagram illustrating processes used to operate a walking apparatus according to embodiments of the invention.

FIG. 12 is a flow diagram illustrating processes used to operate a walking apparatus according to embodiments of the invention. A flow 2400 may begin with a first process 2405 where a lifter is activated to raise the support foot. Flow 2400 then proceeds to process 2410 where a direction of travel is determined. The roller track is then rotated in process 2415 to align the roller assembly orientation with the determined direction of travel. The position of the roller track is locked in process 2420 and the foot is displaced in the direction of travel in process 2425. The lifter is activated to lower the support foot and raise the load in process 2430. In process 2435 the travel mechanism is activated to displace the roller assembly along the direction of travel. The lifter is activated in process 2440 to lower the load and raise the foot. It is then determined if the direction of travel needs to be changed for the next movement in process 2445. If it does not need to be changed, flow 2400 returns to process 2425 where the foot is again displaced in the direction in travel. Alternatively, when it is determined that the direction of travel does need to be changed in process 2445, flow 2400 returns to process 2410 where the new direction of travel is determined.

Figure 13:
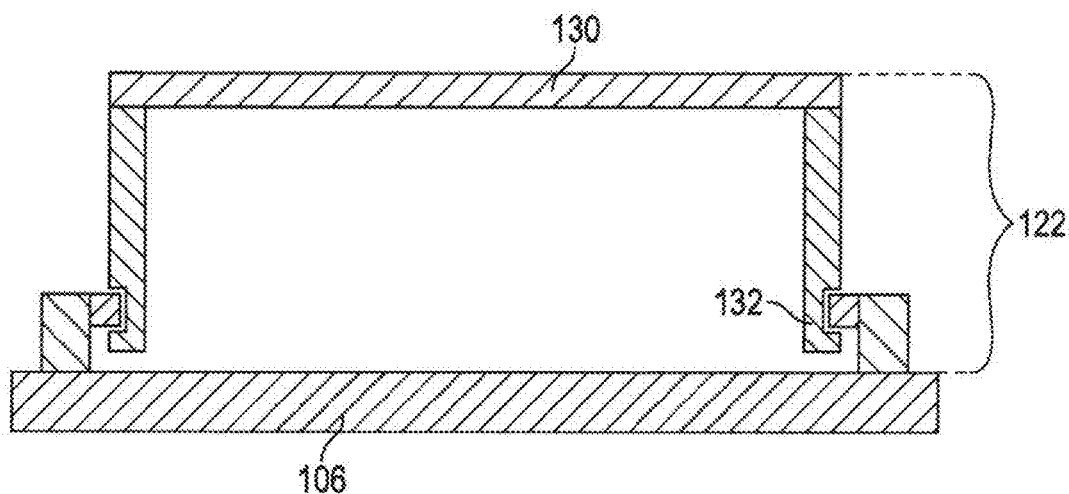
FIG. 13 is an illustration of a saddle housing where a track is not included.

FIG. 13 is an illustration of a saddle housing 122 where a track 312 is not included. Here, the lower saddle housing 132 couples the saddle housing 122 to the foot 106.

Figure 14:
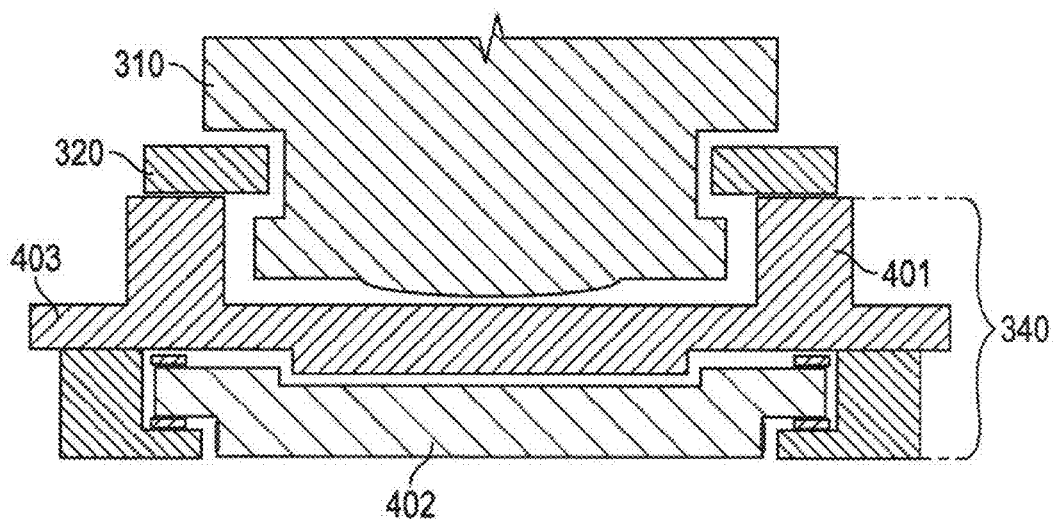
FIG. 14 is a cut-away view of a rotary interlock usable within the load transporting apparatus.

FIG. 14 is a cut-away view of a rotary interlock 340 usable within the load transporting apparatus. The rotary interlock 340 may include two or more members designed to rotate freely about each other in an unloaded/semi-loaded state. At least a first member 401 may interface with a second member 403 intended to rotate about the axis of the at least one first member(s) 401. The rotation of the rotary interlock 340 may occur above the saddle house 122 (not shown).

The first member 401 may be configured to interconnect with the lifter in a non-limiting embodiment. In an additional non-limiting embodiment, the crosshead plate (not shown) may be attachable to the first member 401. The first member 401 may function as the datum of origin within load transporting apparatus.

The second member 402 may be an interlocking ring in a non-limiting embodiment. An optional interlock interface 402 may be disposed within the second member 403 to connect the rotary interlock 340 to the saddle house 122. In the absence of the optional interlock interface 402, the second member 402 may be configured to interface with the saddle house 122 instead. The combination of members may have bearing surfaces and components with the intention of eliminating drag due to friction and may contain surface and components configured to reduce wear on the rotary interlock 340. The components of the rotary interlock 340 may be configured to interlock together to prohibit separation of the components within the rotary interlock 340 during a suspended state, whether loaded or unloaded. The rotary interlock 340 may be configured to freely rotate about the members to which it is coupled. Alternatively, the rotary interlock 340 may be configured to be coaxially fixed to one or more members.

The material of the members within the rotary interlock 340 may be or include, but is not limited to, metal (e.g. steel), plastic, ceramic, stone, and combinations thereof. The members may be of any shape capable of rotating freely about another member. A non-limiting example of the shape may be a ring.

In a non-limiting embodiment the piston rod 310 may connect with the rotary interlock 340 with the interconnector 320. The rotary interlock 340 may include a first interlocking component 401 connectable to a second interlocking component 403. In a non-limiting embodiment, the rotary interlock 340 includes a crosshead 404 between the first interlocking ring 401 and the second interlocking ring 403. A coupler 402 may couple the saddle to the rotary interlock 340.

Figure 15:
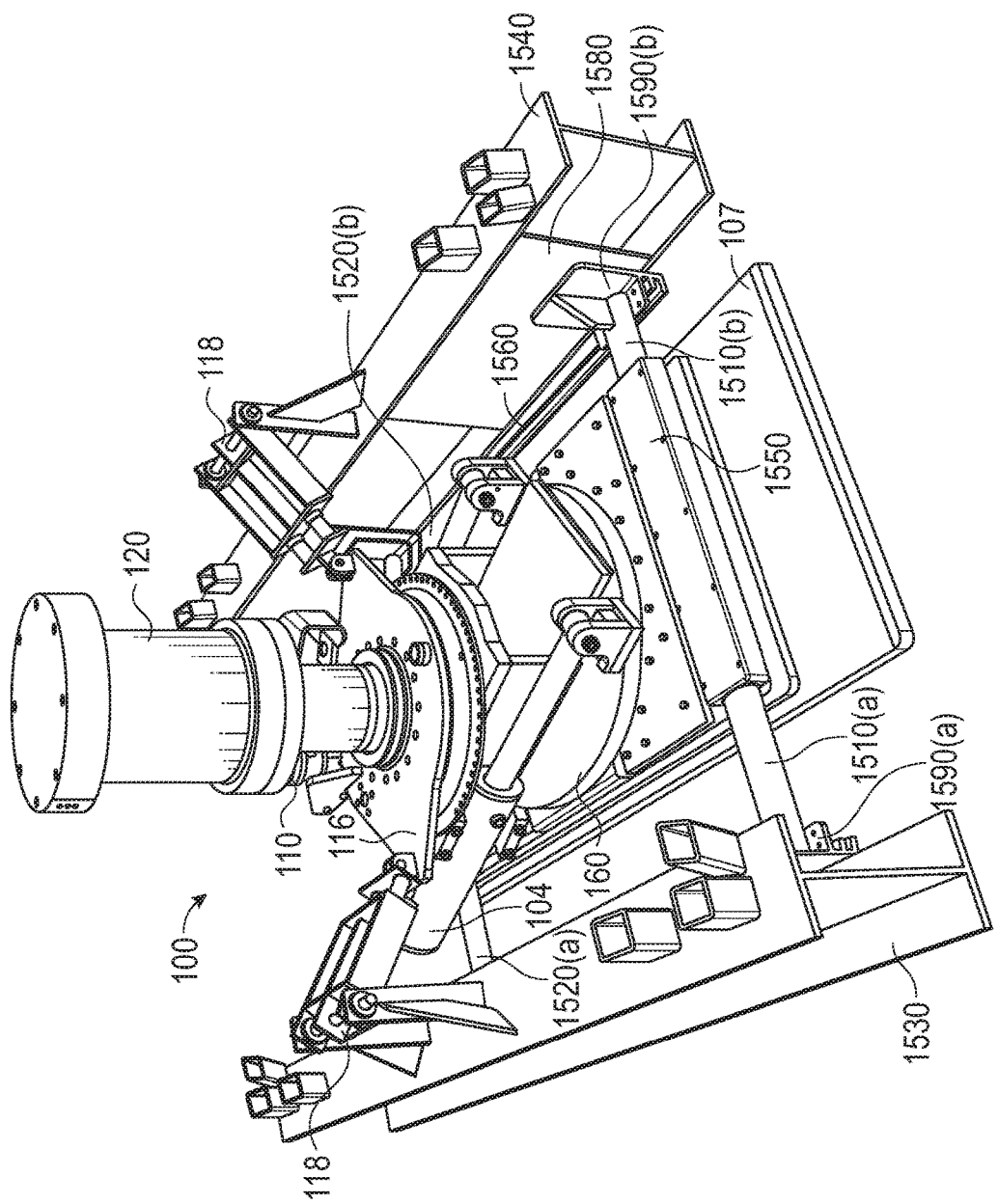
FIG. 15 is an illustration of a stabilizer frame apparatus configured for engaging a load transporting apparatus.

FIG. 15 is an illustration of a stabilizer frame apparatus configured for engaging a load transporting apparatus 100. In FIG. 15, the load transporting apparatus 100 is engaged with the stabilizer frame apparatus. Alternatively, the load transporting apparatus 100 may be attachable to or slidably engagable with the stabilizer frame apparatus by other means available to those skilled in the art. In addition, the stabilizer frame apparatus may be configured to integrate into a load structure (e.g. a rig structure) where the load structure supports the load. In addition, the load structure may move in relation to the stabilizer frame apparatus and the load transporting apparatus.

The stabilizer frame apparatus may have a first stabilizer bar 1510 configured to connect to the load transporting apparatus 100. The first stabilizer bar 1510 may have a first end 1510a and a second end 1510b. The first end 1510a of the first stabilizer bar may be operatively coupled to the first end 1520a of the second stabilizer bar by a first stabilizer beam 1560, and the second end 1510b of the first stabilizer bar is operatively coupled to the second end 1520b of the second stabilizer bar by a second stabilizer beam (not shown).

The first end 1510a may be configured to connect to and/or slidably engage with a first sidewall 1530. The second end 1510b may be configured to connect to and/or slidably engage with a second sidewall 1540.

The stabilizer frame apparatus may have a second stabilizer bar 1520 configured to connect to the load transporting apparatus 100. The second stabilizer bar 1520 may have a first end 1520a and a second end 1520b. The first end 1520a may be configured to connect to and/or slidably engage with the first sidewall 1530. The second end 1520b may be configured to connect to and/or slidably engage with the second sidewall 1540.

The first and/or second stabilizer bars 1510/1520 may be separate from a load structure (e.g. rig structure) but configured to integrate into the load structure in a non-limiting embodiment. Alternatively, the first 1530 and/or second sidewalls 1540 may be part of the load structure, and the first stabilizer bar 1510 and the second stabilizer bar 1520 may be configured to connect thereto and/or slidably engage therewith. In a non-limiting embodiment, the stabilizer frame apparatus may include the first sidewall 1530 and/or the second sidewall 1540.

In a non-limiting embodiment, the stabilizer frame apparatus may include at least one origin stabilizer 118 configured to connect to at least one of the first sidewall 1530 and/or the second sidewall 1540. In a non-limiting embodiment, the origin stabilizer(s) 118 may pivot from a fixed location when connected to the first sidewall 1530 and/or the second sidewall 1540. In yet another non-limiting embodiment, the origin stabilizer(s) may be configured to couple to the load transporting apparatus 100 by coupling to at least one of a cross headplate, a transverse cylinder, a lifter, and combinations thereof.

In another non-limiting embodiment, the first stabilizer bar 1510 and/or the second stabilizer bar 1520 may have an optional stabilizer frame apparatus coupler 1550 for easier coupling of the stabilizer frame apparatus to the load transporting apparatus 100. When the stabilizer frame apparatus coupler 1550 is not used, the first stabilizer bar 1510 and/or the second stabilizer bar 1520 may engage or connect or attach to the load transporting apparatus 100 by gluing, welding, or another form of coupling the stabilizer frame apparatus to the load transporting apparatus 100.

In yet another non-limiting embodiment, at least one additional crossbar (not shown) may be configured to connect to and/or slidably engage with the first sidewall 1530 and/or the second sidewall 1540 for additional stability of the load and/or load transporting apparatus.

The first stabilizer bar 1510 and the second stabilizer bar 1520, the first stabilizer beam 1560 and the second stabilizer beam 1570, and the origin stabilizer 118 allow the pad saver 107 to maintain and remain in a substantially parallel configuration between the first sidewall 1530 and the second sidewall 1540 of the load structure.

Figure 16:
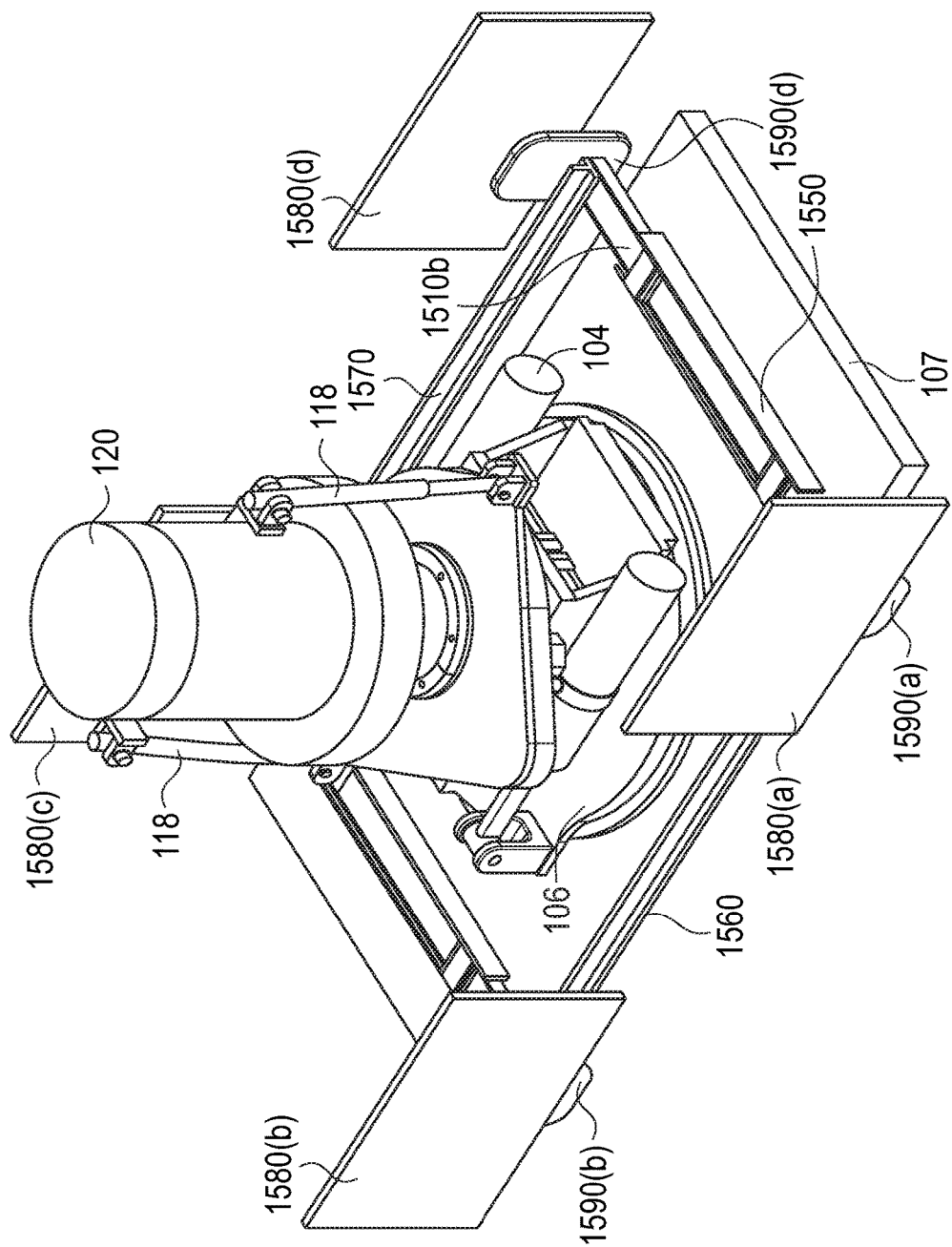
FIG. 16 is an isometric view of a stabilizer frame apparatus engaged with a load transporting apparatus.

FIG. 16 is an isometric view of a stabilizer frame apparatus engaged with a load transporting apparatus 100 in the absence of the first sidewall 1530 and the second sidewall 1540 to further illustrate various features of the stabilizer frame apparatus.

A biasing device 1580 is illustrated next to its respective slidable engager 1590. Each biasing device 1580 may be affixed or otherwise coupled to a sidewall of a load structure to allow slidable engagement with a slidable engager 1590. The slidable engager 1590a may be affixed or operatively coupled to a first end 1510a of the first stabilizer bar. Each end of each stabilizer bar may have a slidable engager affixed or operatively coupled to each end thereof in a non-limiting embodiment. However, it is not necessary that each slidable engager 1590 be the exact same, so long as it allows slidable engagement with the biasing device 1580.

In another non-limiting embodiment, the stabilizer frame apparatus coupler 1550 exposes the first stabilizer bar 1510 as shown in FIG. 16. The coupler 1550 may be any coupler capable of maintaining the stabilizer bar(s) in a stable position, such as but not limited to a sleeve type coupler (as depicted in FIG. 15), a trough type coupler as shown here, a set of rings disposed on the pad saver 107 where the stabilizer bar slides therethrough, and combinations thereof.

In addition, a first stabilizer beam 1560 may couple the first end 1510a of the first stabilizer bar 1510 to the first end 1520a of the second stabilizer bar 1520. A second stabilizer beam 1570 may couple the first end 1510b of the first stabilizer bar 1510 to the first end 1520b of the second stabilizer bar 1520. The stabilizer beams may be any material capable of maintaining the first stabilizer bar 1510 in a pre-determined position relative to the second stabilizer bar 1520 during movement of a load. Said differently, the stabilizer beams 1560,1570 may allow for maintaining a pre-determined alignment between the first stabilizer bar 1510 and the second stabilizer bar 1520 relative to a load structure before movement, during movement, and after movement of a load by a load transporting apparatus when engaged with the stabilizer frame apparatus.

Figure 17:
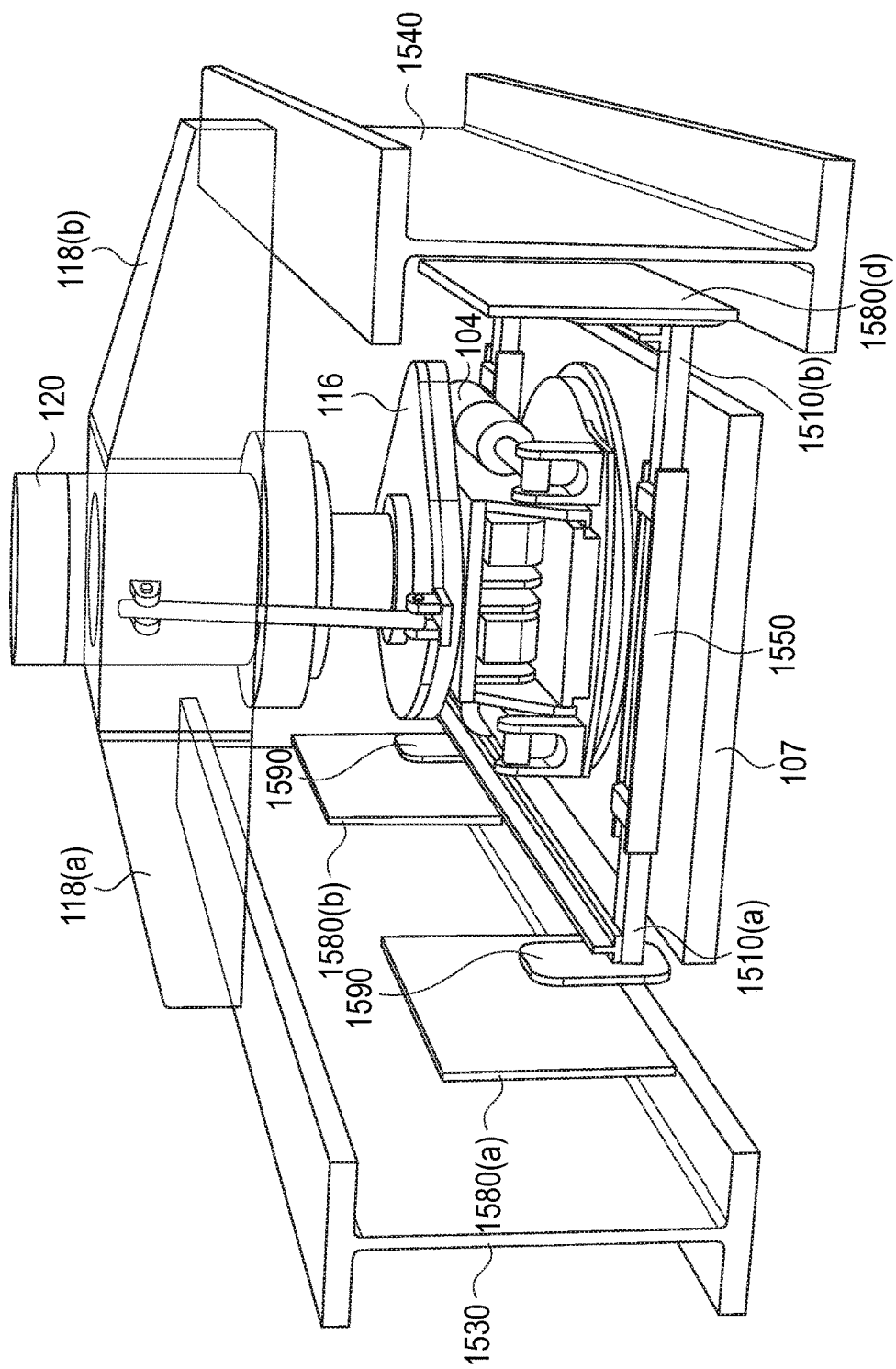
FIG. 17 depicts a non-limiting embodiment of a stabilizer frame apparatus highlighting a particular origin stabilizer.

FIG. 17 is similar to FIG. 16 with regards to the embodiment depicted therein; however, the origin stabilizer 118 is depicted as a rectangular middle piece where the lifter 120 of the load transporting apparatus 100 extends therethrough, and two end pieces 118a,b are coupled to the rectangular middle piece. A first end piece 118a may contact a first sidewall 1530 of the load structure, and a second end piece 118b may contact a second sidewall 1540 of the load structure. In a non-limiting embodiment, the origin stabilizer(s) 118 may be permanently affixed to or slidably engaged with the sidewalls.

Figure 18:
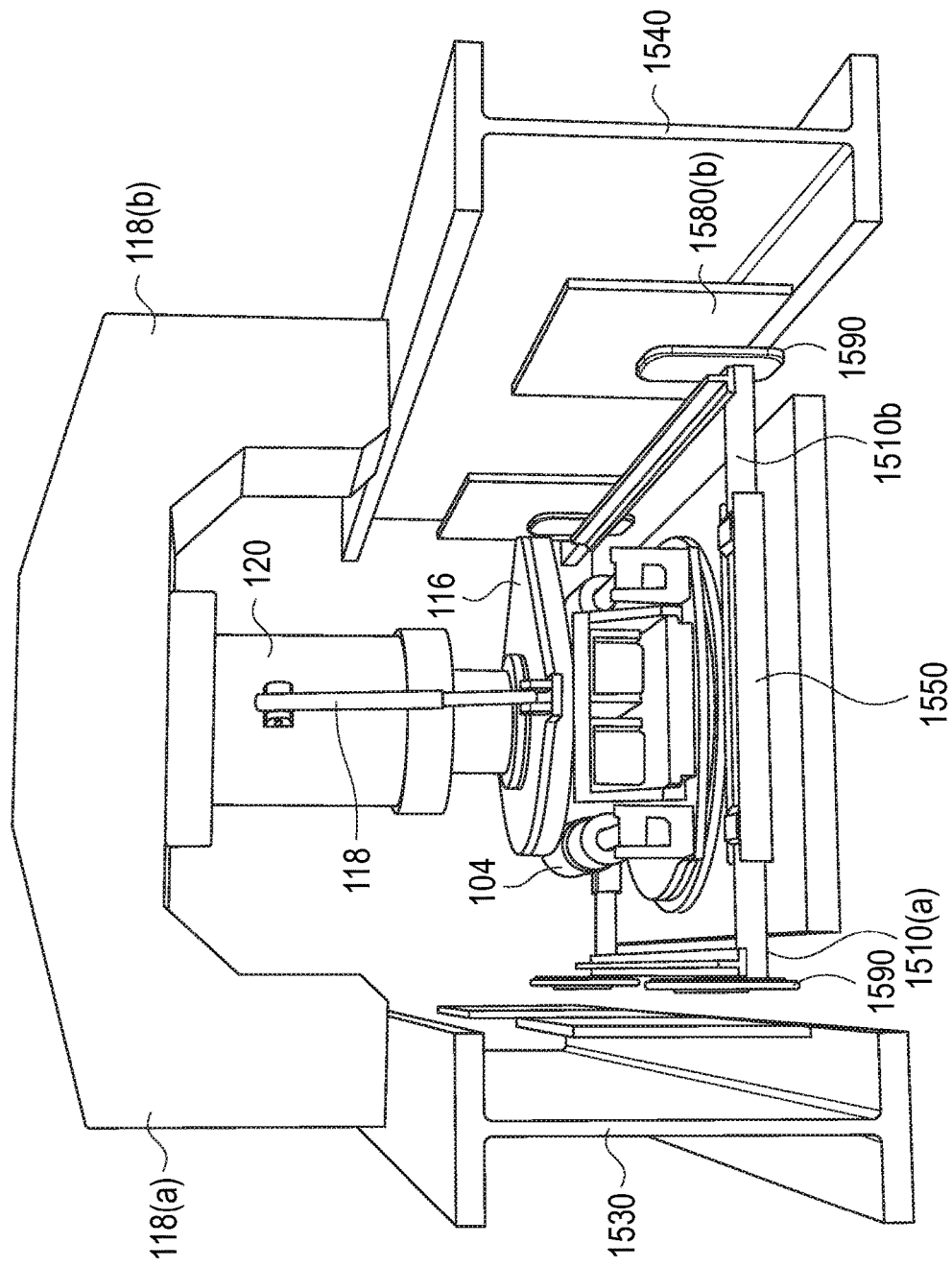
FIG. 18 depicts a non-limiting embodiment of a stabilizer frame apparatus highlighting another type of origin stabilizer.

FIG. 18 is similar to FIG. 17, but the end pieces 118a,b of the origin stabilizer have a slightly different shape. It is worth noting that even though the end pieces 118a,b of the origin stabilizer are depicted in FIGS. 17 and 18 as being identical, they may take on any shape necessary regardless of symmetry, so long as the origin stabilizer(s) is capable of maintaining a relatively stable directional orientation relative to the load structure. Also worth noting, when two or more origin stabilizers 118 are included, the origin stabilizers 118 may be identical or different in size, shape, weight, and combinations thereof.

The origin stabilizer 118 may be disposed over the lifter 120. However, it would also be possible to have the lifter 120 disposed through a rectangular portion of the origin stabilizer 118 similar to that depicted in FIG. 17. In a non-limiting embodiment, each origin stabilizer 118 of the one or more origin stabilizers may be configured to couple or operatively coupled to a different location of the load transporting apparatus 100.

Figure 19:
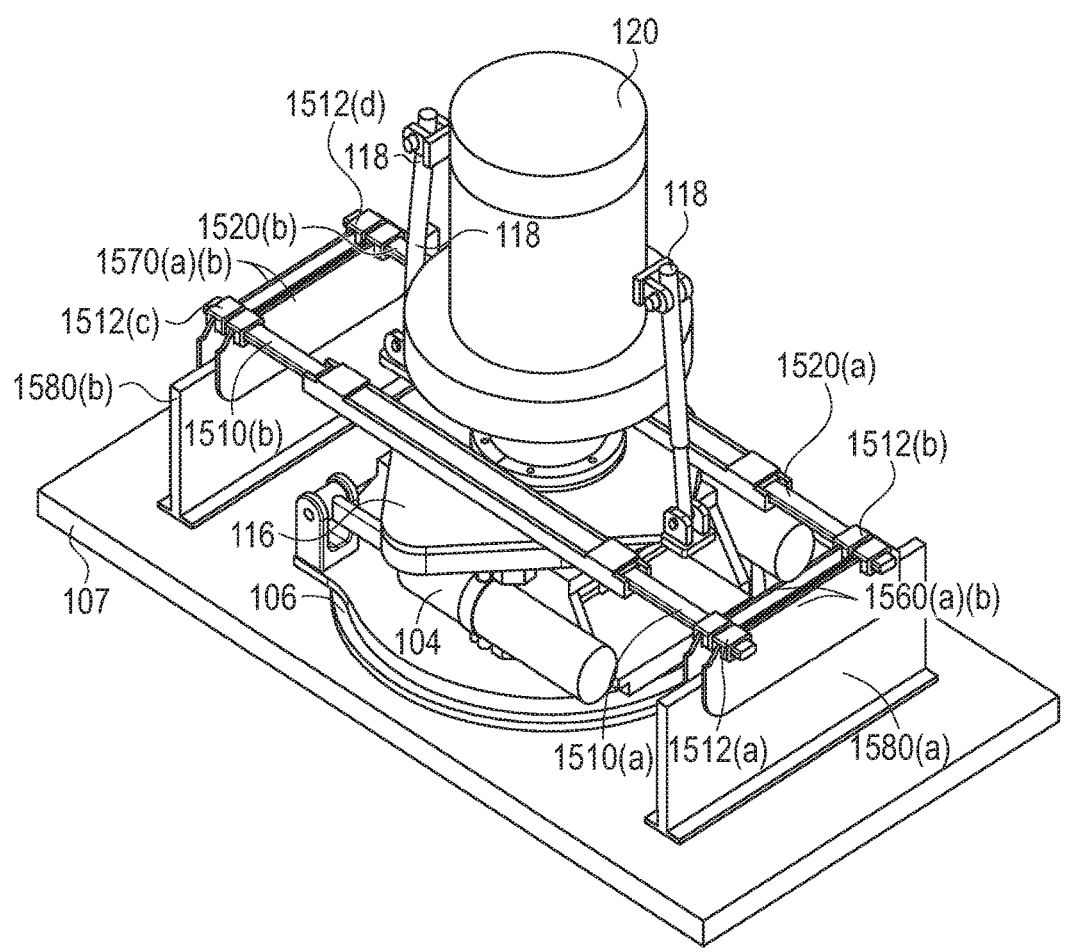
FIG. 19 is an isometric view of another non-limiting embodiment of a stabilizer frame apparatus.

FIG. 19 is an isometric view of another embodiment of the stabilizer frame apparatus. In this non-limiting embodiment, the first stabilizer bar 1510 and the second stabilizer bar 1520 are depicted as being in a perpendicular orientation compared to their orientation depicted in FIGS. 15-18 above. Here, a first end 1510a of the first stabilizer bar and a second end 1520a of the second stabilizer bar are operatively coupled by a pair of stabilizer beams 1560a,b. Similarly, a second end 1510b of the first stabilizer bar and a second end 1520b of the second stabilizer bar are operatively coupled by a pair of stabilizer beams 1570a,b. The stabilizer beams 1560a,b and 1570a,b are depicted as being affixed to the stabilizer bars 1510, 1520 by a partitioned coupler 1512a,b,c,d where each partitioned coupler is affixed to each end of the stabilizer bar, and each partitioned coupler has two partitions to engage each panel of the biasing devices 1560 and 1570. However, each stabilizer bar may be operatively coupled to each stabilizer beam in a number of ways, such as but not limited to screws, glue, welding each stabilizer bar to each beam, and combinations thereof. In addition, each stabilizer beam 1560, 1570 is depicted as having two panels; however, each of the two panels 1560*a,b* and/or 1570*a,b* may be connectable together to form each stabilizer beam 1560 or 1570.

A biasing device 1580*a,b* may slide between the stabilizer beams 1560 and 1570. The biasing devices 1580*a,b* may be affixed or operatively coupled to the pad saver 107.

FIGS. 20*a*-20*d* depict a stabilizer frame apparatus operatively coupled to a load structure by an origin stabilizer 118 but in the absence of any slidable engagers. FIGS. 20*a*-20*d* illustrate several different positions where the stabilizer frame apparatus moves between a first sidewall 1530 and a second sidewall 1540 without the assistance of slidable engagers, while the pad saver 107 remains in a pre-determined parallel configuration therebetween without touching the sidewalls. The first stabilizer bar 1510 and the second stabilizer bar 1520, the first stabilizer beam 1560 and the second stabilizer beam 1570, and the origin stabilizer 118 allow the pad saver 107 to remain in a parallel configuration between the first sidewall 1530 and the second sidewall 1540 without touching the sidewalls.

Figure 21:
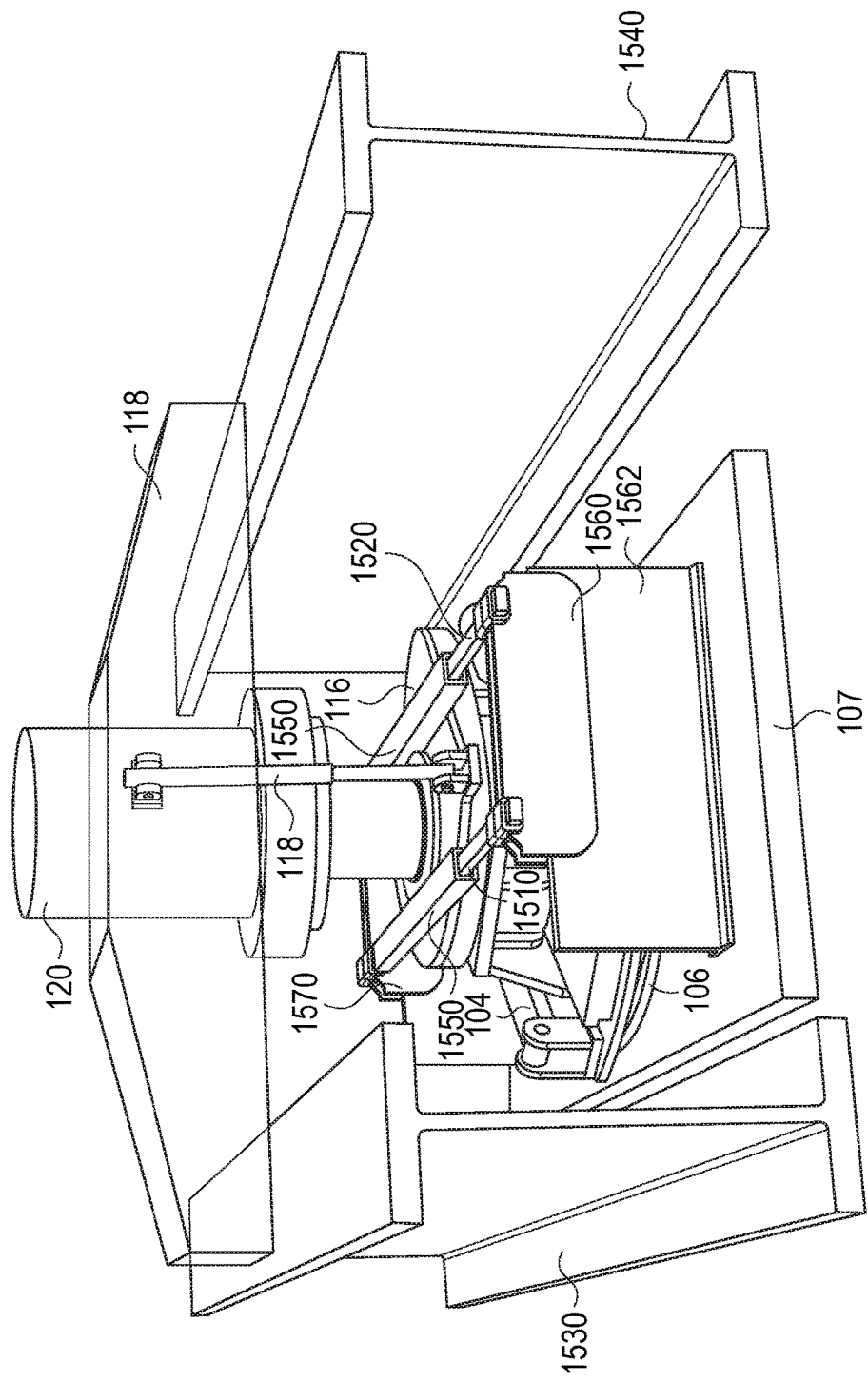
FIG. 21 is an isometric view of a non-limiting embodiment of a stabilizer frame apparatus engaged with a load transporting apparatus.

FIG. 21 is an isometric view of the stabilizer frame apparatus depicted in FIGS. 20*a-d*. FIG. 21 is similar to FIG. 19 in its non-limiting embodiment, but further illustrates how the stabilizer frame apparatus operatively couples to the first sidewall 1530 and the second sidewall 1540 by an origin stabilizer 118. The origin stabilizer 118 may operatively couple to the sidewalls by any mechanism known to those skilled in the art, as well as any of the mechanisms discussed with respect to FIGS. 17 and 18, above.

Figure 22:
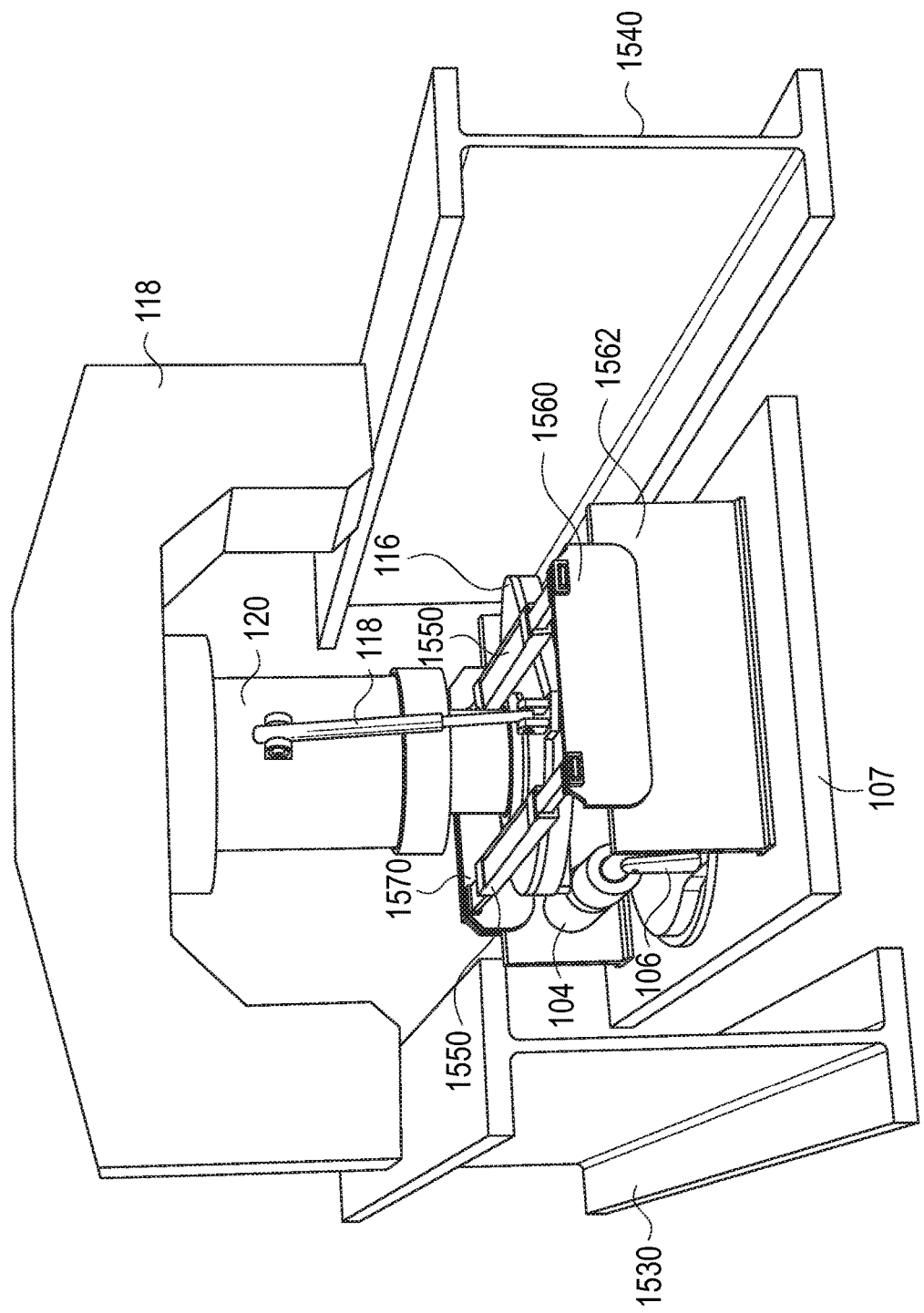
FIG. 22 depicts a non-limiting embodiment of another stabilizer frame apparatus engaged with a load transporting apparatus.

FIG. 22 is similar to FIG. 21 in its non-limiting embodiment, but illustrates an origin stabilizer 118 similar to that of FIG. 18.

FIG. 23 depicts several positions of the load transporting apparatus 100 as it moves between the first sidewall 1530 and the second sidewall 1540 in the absence of any slidable engagers. As can be seen in this figure, the load transporting apparatus 100 is rotated about the axis where the load transporting apparatus is configured to connect to the origin stabilizer 118.

Figure 24:
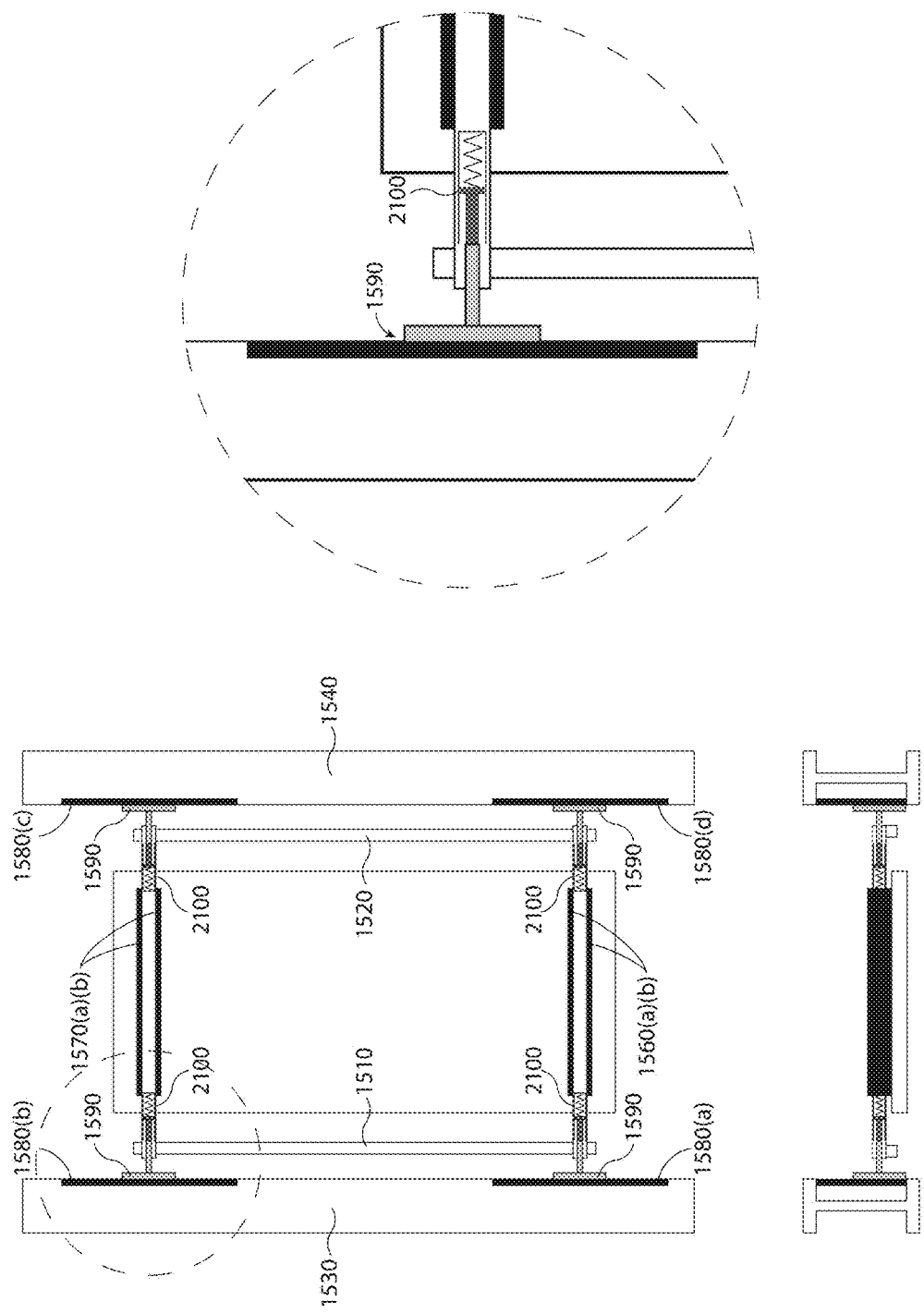
FIG. 24 depicts a non-limiting embodiment of a stabilizer frame apparatus having retractable engagers engaging sidewalls of a load structure.

FIG. 24 depicts a non-limiting embodiment of a stabilizer frame apparatus having retractable engagers 1590. After the stabilizer frame apparatus has stopped moving, the stabilizer frame apparatus may extend a retractable engager 1590 from one or more ends of each of the first stabilizer bar 1510 and/or the second stabilizer bar 1520 to engage a first sidewall 1530 and/or to engage a second sidewall 1540. When the load transporting apparatus is preparing to move the load, the stabilizer frame apparatus may retract the retractable engager(s) away from the sidewalls to allow the stabilizer frame apparatus and the load transporting apparatus to freely move between the sidewalls 1530 and 1540, while maintaining a pre-determined parallel configuration of the pad saver 107 between the sidewalls 1530 and 1540.

In a non-limiting embodiment, the retractable engagers 1590 may be or include, but are not limited to a cylinder, a magnet, a spring, and combinations thereof. In a non-limiting embodiment, the retractable engagers are cylinders where hydraulic fluid may be used to push the retractable engagers out of the stabilizer beam(s) 1560/1570 to engage the first sidewall 1530 and/or the second sidewall 1540. The hydraulic fluid may be circulated in the direction of the retractable engager(s) for a period necessary to maintain an engaged state between the stabilizer bar(s) and the sidewall(s) during non-movement of the stabilizer frame apparatus and the load transporting apparatus.

In another non-limiting embodiment, the retractable engagers may be used in an opposite manner, i.e. the retractable engager(s) may engage the sidewall(s) during movement of the stabilizer frame apparatus and the load transporting apparatus.

Figure 25:
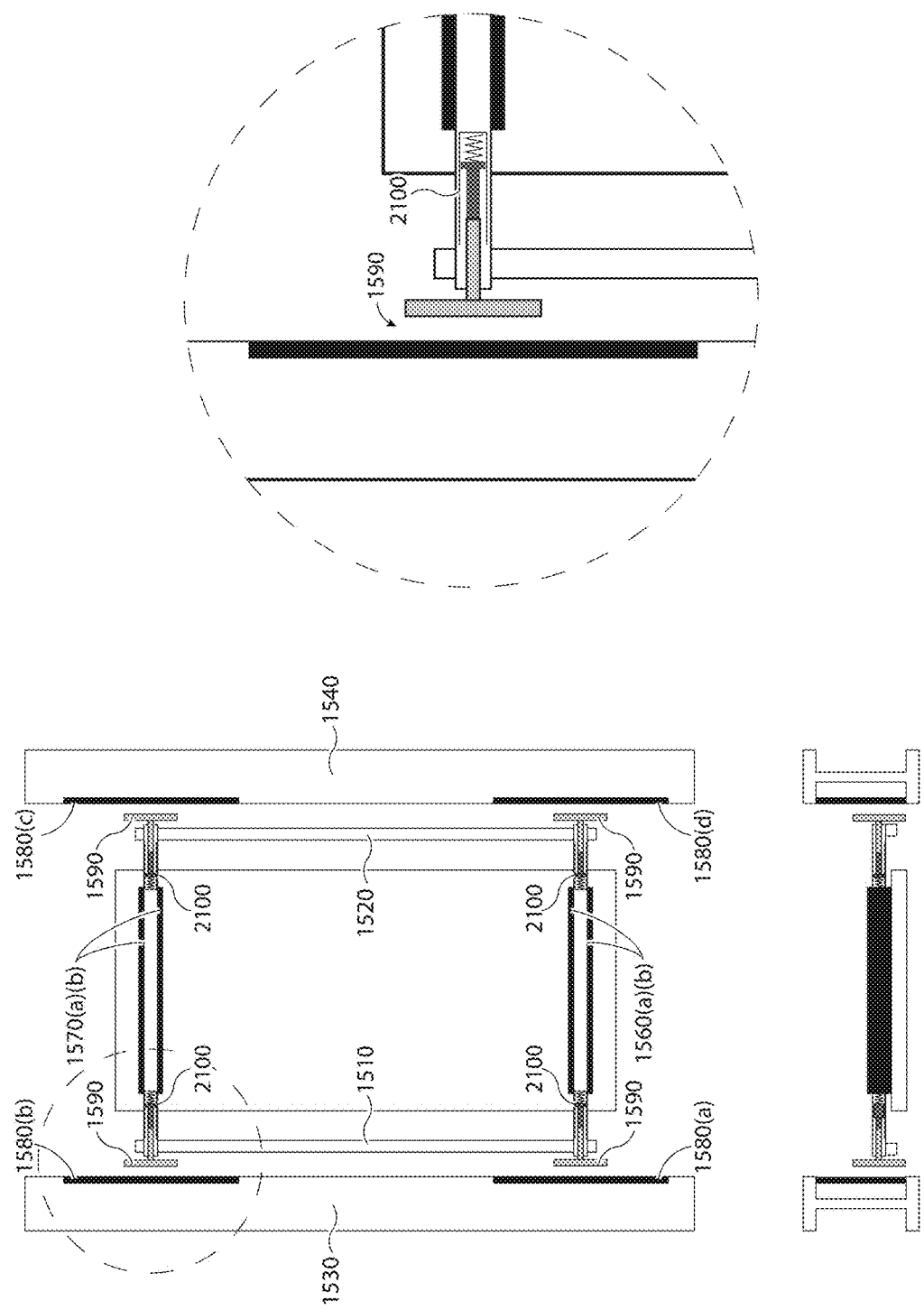
FIG. 25 illustrates a non-limiting embodiment of a stabilizer frame apparatus having retractable engagers in a retracted state.

FIG. 25 illustrates a non-limiting embodiment of a stabilizer frame apparatus where the retractable engagers 1590 are in a retracted state.

FIGS. 24-25 do not depict origin stabilizers 118 in the embodiments therein. However, any of the origin stabilizers already discussed, above, may be incorporated into the stabilizer apparatuses depicted in FIGS. 24-25.

Figure 26:
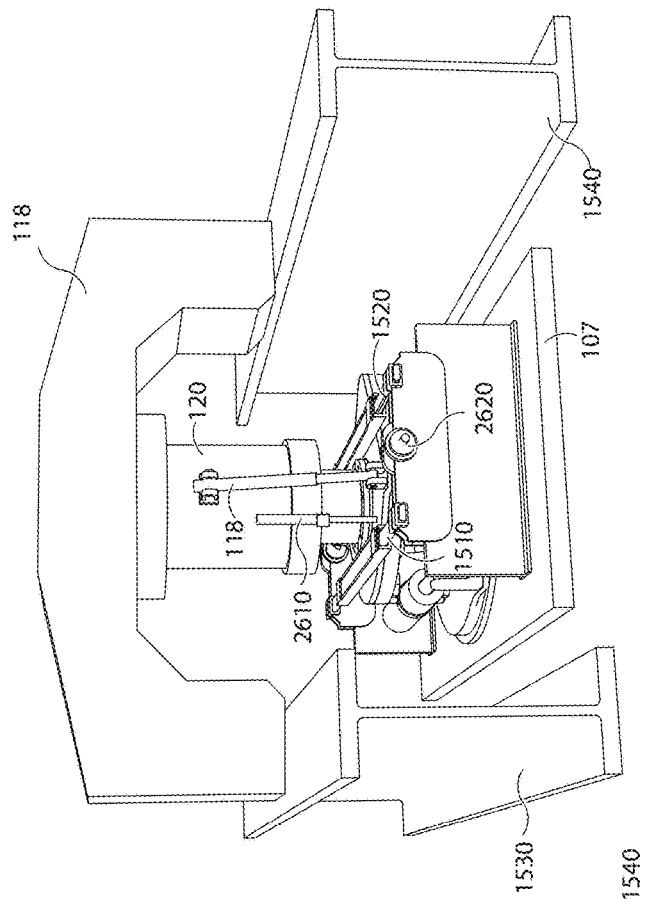
FIG. 26 illustrates an orthogonal view of a non-limiting embodiment of a stabilizer frame apparatus having a stabilizer switch mechanism.

FIG. 26 illustrates an orthogonal view of a non-limiting embodiment of a stabilizer frame apparatus having an optional stabilizer switch mechanism 2610. The stabilizer switch mechanism 2610 may control an (optional) stabilizer frame actuator 2620. The stabilizer switch mechanism 2610 may utilize hydraulic fluid and/or electrical sensors for actuating the stabilizer frame actuator 2620 to contract (e.g. close or push) the stabilizer beams 1560/1570 together or to release the contracting force (e.g. opening) from the stabilizer beams 1560/1570. Said differently, the actuator 2620 may close or push the stabilizer beams 1560/1570 together and/or may allow a space to widen between the stabilizer beams 1560/1570.

In a non-limiting embodiment where the stabilizer switch mechanism 2610 utilizes hydraulic fluid, a conduit (not shown) such as but not limited to a hose, a pipe, or combinations thereof, may allow for hydraulic fluid to flow in the direction of the actuator 2620. The force and/or pressure of the hydraulic fluid may push the portions outside the stabilizer beams 1560/1570 together, and thereby cause the stabilizer beams 1560/1570 to be pushed closer together. When the switch mechanism 2610 causes the hydraulic fluid to stop flowing, the actuator is released, which allows a gap or space to form between the stabilizer beams 1560/1570.

In yet another non-limiting embodiment of the switch mechanism 2610, a sensor may be placed on the actuator 2620. The switch 2610 may send a signal to the actuator 2620 to contract or push the stabilizer beams 1560/1570 together, when desired. When it is no longer desired for the actuator to continue doing so, another signal may be sent to the actuator 2620 to release the force and/or pressure from contracting or pushing the stabilizer beams 1560/1570 together.

Figure 27A:
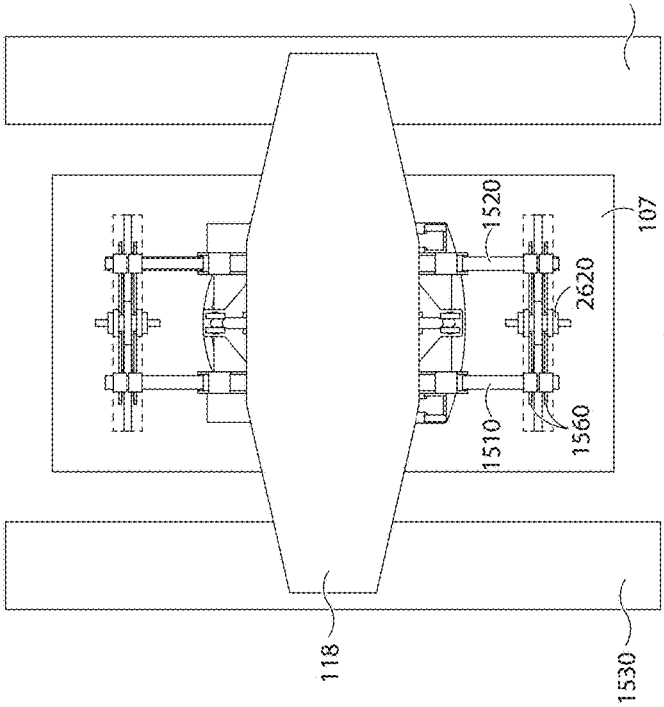
FIGS. 27A-B illustrate are different views of a non-limiting embodiment of a stabilizer actuator.
Figure 27B:
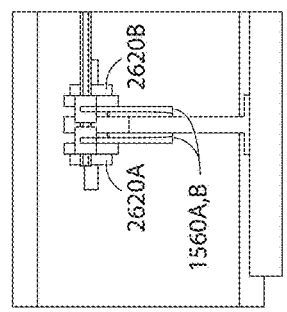

FIGS. 27A-B illustrate different views of a non-limiting embodiment of a stabilizer actuator. FIG. 27A is a top view of a non-limiting embodiment of a stabilizer frame apparatus, which also allows for an aerial view of the actuator 2620. The actuator 2620 may have a bolt, screw, or another type of attaching mechanism through the stabilizer beams 1560/1570. On each side of the stabilizer beams 1560/1570 where the actuator extends therethrough, a coupler (e.g. a bolt, glue, welding, and combinations thereof) may operatively couple the actuator 2620 to the stabilizer beams 1560/1570.

FIG. 27B is a side view and enlarged illustration of the actuator 2620 where each end 2620*a* and 2620*b* can be seen extending through the stabilizer beams 1560/1570.

What is claimed is:
1. A stabilizer frame apparatus configured for engaging a load transporting apparatus, wherein the stabilizer frame comprises:
 a first stabilizer bar configured to couple to the load transporting apparatus; wherein the first stabilizer bar comprises a first end and a second end;

a second stabilizer bar configured to couple to the load transporting apparatus; wherein the second stabilizer bar comprises a first end and a second end; and wherein the first end of the first stabilizer bar is operatively coupled to the first end of the second stabilizer bar, wherein the second end of the first stabilizer bar is operatively coupled to the second end of the second stabilizer bar, wherein the first end of the first stabilizer bar is configured to slidably engage with a first sidewall of a load structure supporting the load; and wherein the second end of the first stabilizer bar is configured to slidably engage with a second sidewall of a load structure supporting the load, and wherein the stabilizer frame apparatus is configured to operatively integrate into a load structure.

2. The stabilizer frame apparatus of claim 1, wherein the stabilizer frame apparatus further comprises a first sidewall of a load structure supporting the load.

3. The stabilizer frame apparatus of claim 2, wherein the stabilizer frame apparatus further comprises a second sidewall of the load structure.

4. The stabilizer frame apparatus of claim 1, further comprising one or more origin stabilizers configured to couple to at least one of a first sidewall and/or a second sidewall of a load structure supporting the load.

5. The stabilizer frame apparatus of claim 1, further comprising one or more origin stabilizers configured to couple to the load transporting apparatus by coupling to at least one of a cross headplate, a transverse cylinder, a lifter, and combinations thereof.

6. The stabilizer frame apparatus of claim 1, further comprising one or more stabilizer couplers operatively coupled between the first stabilizer bar and the second stabilizer bar at a first end and/or a second end thereof.

7. The stabilizer frame apparatus of claim 1, further comprising a load transporting apparatus engaged with the stabilizer frame apparatus.

8. The stabilizer frame apparatus of claim 1, wherein the first end of the second stabilizer bar is configured to slidably engage with a first sidewall of a load structure supporting the load; and wherein the second end of the second stabilizer bar is configured to slidably engage with a second sidewall of a load structure supporting the load.

9. The stabilizer frame apparatus of claim 1, wherein the first stabilizer bar and the second stabilizer bar are operatively coupled to a first sidewall and/or a second sidewall by one or more origin stabilizers; wherein the first sidewall and/or the second sidewall are part of a load structure supporting the load.

10. The stabilizer frame apparatus of claim 1, wherein the first stabilizer bar and the second stabilizer bar maintain a freely movable orientation in one or more directions with regards to a load structure supporting the load during movement of the load by the load transporting apparatus.

11. The stabilizer frame apparatus of claim 1, wherein the first stabilizer bar and/or the second stabilizer bar are slidably engaged with one or more biasing members.

* * * * *